United States Patent
Yumiki

(10) Patent No.: US 8,131,142 B2
(45) Date of Patent: *Mar. 6, 2012

(54) IMAGING APPARATUS

(75) Inventor: Naoto Yumiki, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/033,697

(22) Filed: Feb. 24, 2011

(65) Prior Publication Data

US 2011/0141295 A1   Jun. 16, 2011

Related U.S. Application Data

(63) Continuation of application No. 12/103,252, filed on Apr. 15, 2008, now Pat. No. 7,917,024.

(30) Foreign Application Priority Data

Apr. 19, 2007 (JP) ................................. 2007-110831

(51) Int. Cl.
G03B 13/36   (2006.01)

(52) U.S. Cl. ........................................ 396/123; 396/263

(58) Field of Classification Search .......... 396/121–124, 396/263, 322; 348/345–357, 333.02, 333.03, 348/333.05
See application file for complete search history.

(56) References Cited

U.S. PATENT DOCUMENTS

| | | | |
|---|---|---|---|
| 4,933,700 A * | 6/1990 | Ikeda et al. | .................. 396/123 |
| 4,959,678 A | 9/1990 | Nakagawa | |
| 6,614,998 B1 * | 9/2003 | Senba et al. | .................. 396/123 |
| 6,633,655 B1 | 10/2003 | Hong et al. | |
| 6,765,612 B1 | 7/2004 | Anderson et al. | |
| 6,882,741 B2 | 4/2005 | Dobashi et al. | |
| 7,193,646 B1 | 3/2007 | Shioji | |
| 7,593,633 B2 | 9/2009 | Okamoto et al. | |
| 2005/0264679 A1 | 12/2005 | Sasaki et al. | |
| 2006/0056668 A1 | 3/2006 | Ozaki | |
| 2006/0098105 A1 | 5/2006 | Okisu et al. | |
| 2006/0197845 A1 | 9/2006 | Masaki | |
| 2006/0198623 A1 * | 9/2006 | Ono | .................. 396/89 |
| 2007/0014543 A1 | 1/2007 | Nakase et al. | |

(Continued)

FOREIGN PATENT DOCUMENTS

JP   2000-13671 A   1/2000

(Continued)

OTHER PUBLICATIONS

Japanese Office Action dated Jul. 26, 2011.

Primary Examiner — W. B. Perkey
(74) Attorney, Agent, or Firm — Pearne & Gordon LLP

(57) ABSTRACT

Digital camera is provided with face detection section that detects faces of a plurality of photographing objects, microcomputer performs continuous shooting in optimum photographing conditions in accordance with the number of faces of the photographing objects for each face of the plurality of photographing objects by a single shutter operation and performs control by assigning serial photographing object numbers to the images of the plurality of photographing objects taken by continuous shooting and recording the images in a single continuous-shooting image folder. Furthermore, microcomputer performs continuous shooting in predetermined order in accordance with the number of faces of the photographing objects and detects, when the photographing object speed is equal to or higher than a predetermined value, the photographing object speed again after photographing other photographing objects.

5 Claims, 20 Drawing Sheets

U.S. PATENT DOCUMENTS

| | | |
|---|---|---|
| 2007/0086761 A1 | 4/2007 | Okamoto |
| 2007/0269196 A1 * | 11/2007 | Misawa .................. 396/123 |
| 2007/0280662 A1 | 12/2007 | Endo |
| 2009/0066815 A1 | 3/2009 | Nozaki et al. |

FOREIGN PATENT DOCUMENTS

| | | |
|---|---|---|
| JP | 2000-259833 A | 9/2000 |
| JP | 2002-199202 A | 7/2002 |
| JP | 2003-107335 A | 4/2003 |
| JP | 2004-120576 A | 4/2004 |
| JP | 2004-343803 A | 12/2004 |
| JP | 2005-352164 A | 12/2005 |
| JP | 2006-005662 A | 1/2006 |
| JP | 2006-135590 A | 5/2006 |
| JP | 2006-157428 A | 6/2006 |
| JP | 2006-157617 A | 6/2006 |
| JP | 2006-237961 A | 9/2006 |
| JP | 2006-319610 A | 11/2006 |
| JP | 2006-345254 A | 12/2006 |
| JP | 2007-027995 A | 2/2007 |
| JP | 2007-116236 A | 5/2007 |
| JP | 2007-259004 A | 10/2007 |
| JP | 2007-336411 A | 12/2007 |

* cited by examiner

IMAGING APPARATUS

This application is a continuation of U.S. patent application Ser. No. 12/103,252, filed on Apr. 15, 2008, which is incorporated herein by reference in its entirety.

BACKGROUND OF THE INVENTION

1. Field of the Invention

The present invention relates to an imaging apparatus and an imaging method. More particularly, the present invention relates to an imaging apparatus and an imaging method having a camera shake correcting function and a photographing sensitivity changing function.

2. Description of Related Art

Imaging apparatuses such as digital still cameras and digital video cameras that convert an optical image of the photographing object to electrical image signal and outputs image signal (hereinafter simply referred to as "digital cameras"), have become popular. With reductions in size and weight and escalation in the magnification rate of optical zooming in recent years in particular, digital cameras have become convenient for photographers.

However, accompanying reductions in size and weight and escalation in the magnification rate of optical zooming of digital cameras, a blur may occur in photographed images and may cause image quality degradation.

Patent Document 1 (Japanese Patent Application Laid-Open No. 2000-13671) discloses a digital camera with a blur correcting optical system that reduces the influence of image shake upon the image when a photograph is taken. The digital camera disclosed in Patent Document 1 moves the correction lens up, down, left and right in directions perpendicular to the optical axis, depending on image shake of when a photograph is taken, and corrects image distortion. By this means, it is possible to take a photograph with reduced image shake using a smaller-sized and lighter-weighted digital camera. Furthermore, the digital camera disclosed in Patent Document 1 does not have to use a flash lamp to emit light upon taking a photograph to prevent image shake, so that it is possible to take a photograph under conditions producing similar atmosphere to natural colors.

On the other hand, among causes for degrading image quality of photographed images is object shake caused by the motion of the photographing object, in addition to camera shake caused by vibration such as caused by a shaking hand, added to the camera. Object shake can be prevented by making exposure time shorter and taking a photograph at a high shutter speed. Shutter speed can be made faster by, for example, increasing photographing sensitivity or by lighting a flash lamp. As for optical image shake of the photographing object in the imaging plane, shake caused by vibration applied to the camera will be referred to as "camera shake" and shake caused by the motion of the photographing object will be referred to as "object shake." Camera shake and object shake will be collectively referred to as "image shake" with respect to the imaging plane.

Patent Document 2 (Japanese Patent Application Laid-Open No. 2006-157428) discloses an apparatus with a motion prediction section for predicting the motion of the photographing object and changing photographing conditions such as shutter speed when the photographing object is likely to move, and a method applicable with the apparatus.

Patent Document 3 (Japanese Patent Application Laid-Open No. 2003-107335) discloses a technique of detecting the face, eyes, nose and mouth of a person in image data, using part of the detected face of the person as the automatic focus area (hereinafter referred to as "AF area") and performing automatic focus control.

Generally, when photographing sensitivity is increased, the output signal from the imaging sensor is amplified, and, consequently, noise generated from the imaging sensor is also amplified. Therefore, an image taken in high sensitivity contains a large amount of noise. Increasing photographing sensitivity more than necessary may thus result in image quality degradation. It is therefore desirable to increase photographing sensitivity when camera shake still occurs due to insufficient ambient brightness after correction by the correcting optical system or when a fast-moving photographing object is photographed.

However, with such a conventional imaging apparatus, it is difficult for photographers to identify what level of moving speed of the photographing object causes object shake. Therefore, cases often occur where even though it is possible to take a photograph without object shake, the photographer observing the motion of the photographing object misjudges that object shake will occur. As a result, there is a problem that the photographers change photographing sensitivity to high sensitivity and take a photograph containing a large amount of noise. Furthermore, there is a problem that photographers need to change photographing sensitivity immediately before taking a photograph and might miss the chance to take a photograph.

That is, a general photographer cannot identify what level of moving speed of the photographing object will or will not cause object shake. In other words, using the camera shake correcting function may result in taking a photograph with object shake when the photographing object is moving fast, and increasing ISO sensitivity may result in taking a photograph with a large amount of noise when the photographing object is moving slowly. Therefore, taking photographs in good quality is not possible.

Furthermore, although the digital camera having a blur correcting optical system disclosed in Patent Document 1 can reduce image quality degradation due to camera shake, there is no proposal of easing image quality degradation caused by object shake.

Furthermore, since the digital camera disclosed in Patent Document 2 is only directed to predicting the motion of the photographing object and is not directed to deciding what level of moving speed of the photographing object will or will not cause object shake, it is not always possible to take a photograph at an optimal shutter speed matching the speed of the photographing object.

SUMMARY OF THE INVENTION

It is therefore an object of the present invention to provide an imaging apparatus and an imaging method for reducing image quality degradation due to camera shake and object shake and taking a photograph in good image quality in a simple manner without load on the user.

According to an aspect of the present invention, an imaging apparatus employs a configuration having: an imaging sensor that receives the formed optical image, converts the optical image to an electrical image signal and outputs the image signal; a face detection section that detects faces of a plurality of photographing objects based on the image signal taken in by the imaging sensor; a control section that performs continuous shooting for each face of the plurality of photographing objects by a single shutter operation, in accordance with the number of faces of the photographing objects; and a recording section that records images of the plurality of photographing objects taken by the continuous shooting.

According to another aspect of the present invention, an imaging method includes: detecting faces of a plurality of photographing objects from an image signal taken in by an imaging sensor; performing continuous shooting for each face of the plurality of photographing objects detected by a single shutter operation, in accordance with the number of faces of the photographing objects; and recording images of the plurality of photographing objects taken by the continuous shooting.

DETAILED DESCRIPTION OF THE PREFERRED EMBODIMENT

Embodiments of the present invention will be explained below in detail with reference to the accompanying drawings.

Embodiment 1

Figure 1:
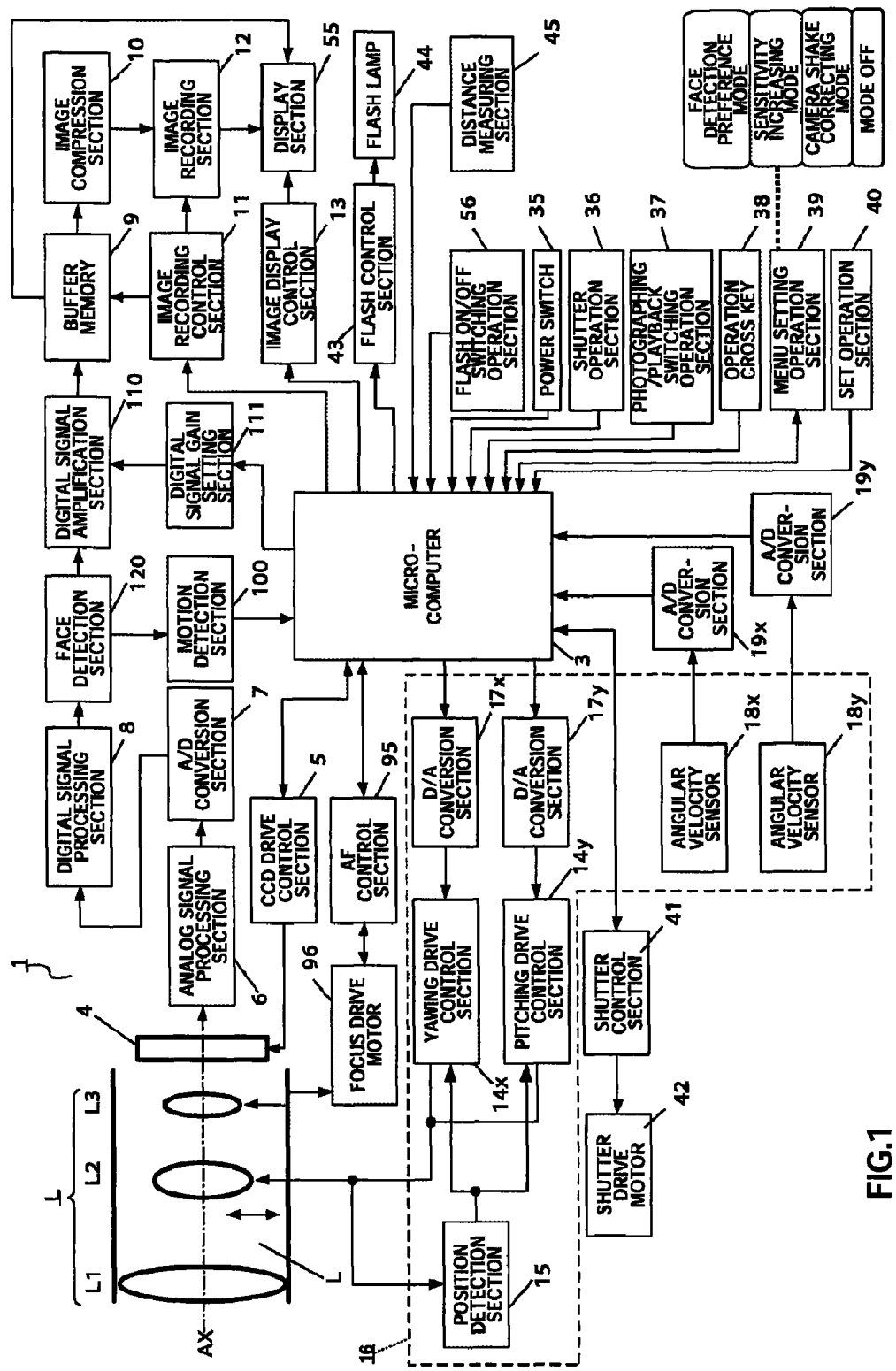
FIG. 1 is a block diagram showing a configuration of an imaging apparatus according to Embodiment 1 of the present invention.
Figure 2A:
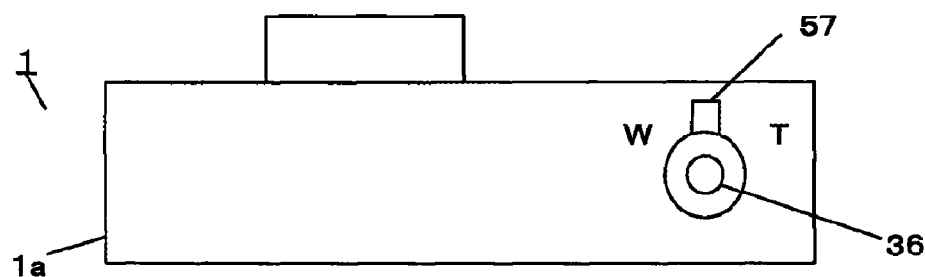
FIG. 2 shows a schematic configuration of an imaging apparatus according to Embodiment 1.
Figure 2B:
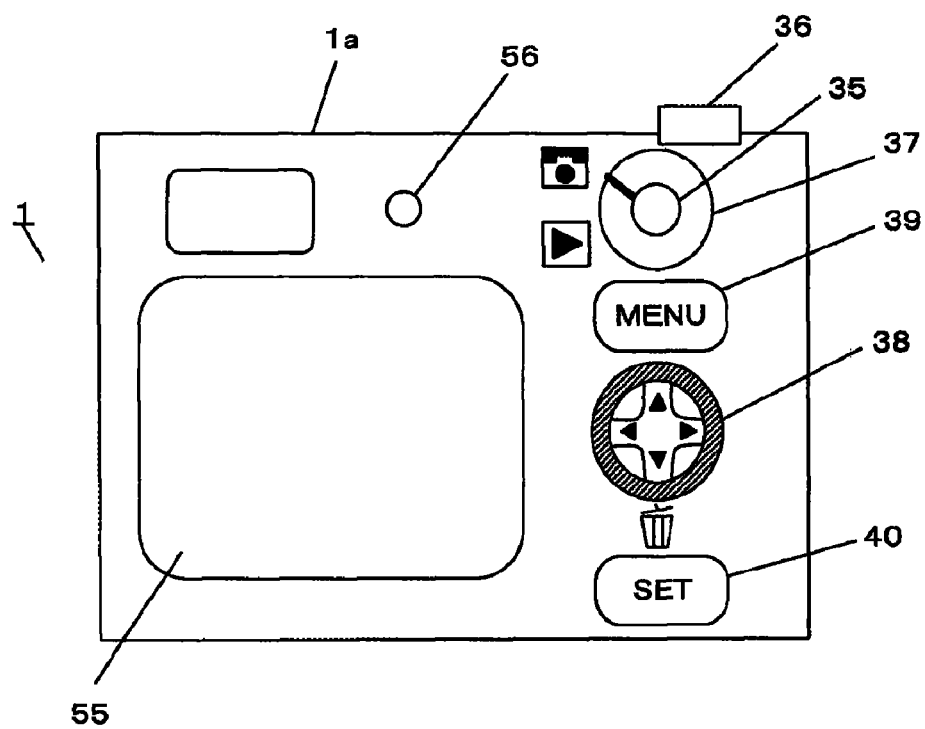

FIG. 1 is a block diagram showing the configuration of an imaging apparatus according to an embodiment of the present invention. FIG. 2 illustrates schematic configuration of the imaging apparatus according to the present embodiment, where FIG. 2(A) shows a top view and FIG. 2(B) shows a rear view. The present embodiment is an example of a digital camera application with a camera shake correcting function and a photographing sensitivity changing function. In the following explanation, the moving speed of the photographing object (hereinafter also referred to as "object speed") is the moving speed of an optical image of the photographing object in the imaging plane, caused by one of or both of camera shake and object shake.

In FIG. 1, digital camera 1 employs a configuration having an the imaging optical system L, microcomputer 3, imaging sensor 4, CCD (Charge Coupled Device) drive control section 5, analog signal processing section 6, A/D conversion section 7, digital signal processing section 8, buffer memory 9, image compression section 10, image record control section 11, image recording section 12, image display control section 13, camera shake correcting section 16, angular velocity sensor 18, display section 55, shutter control section 41, shutter drive motor 42, flash control section 43, flash lamp 44, AF control section 95, focus drive motor 96, motion detecting section 100, digital signal amplification section 110 and digital signal gain setting section 111.

The imaging optical system L is an optical system including three lens groups L1, L2 and L3. The first lens group L1 and the second lens group L2 perform zooming by moving in the direction of the optical axis. The second lens group L2 is a correction lens group that decentralizes the optical axis and corrects the motion of an image by moving in the plane perpendicular to the optical axis. The third lens group L3 performs focusing by moving in the direction of the optical axis. The imaging optical system L is not limited to the above-described optical system configuration.

When mechanical vibration or shake by the photographer is added to digital camera 1, a gap is created between the optical axis of light radiated from the photographing object to the lens and the optical axis of the lens, and, as a consequence, a blurred image is created. Therefore, digital camera 1 has camera shake correcting section 16 and camera shake correcting mechanism 20 which will be described later to prevent a blurred image from being created. Camera shake correcting section 16 and camera shake correcting mechanism 20 are intended to reduce optical image shake caused by the photographer's shake and vibration added to the camera, for example.

Imaging sensor 4 is, for example, a CCD sensor that converts the optical image formed by the imaging optical system L to electrical signal. Imaging sensor 4 is driven and controlled by CCD drive control section 5. Imaging sensor 4 may be a CMOS (Complementary Metal Oxide Semiconductor) sensor.

Microcomputer 3 controls the whole of digital camera 1 and also performs photographing control processing of controlling the camera shake correcting function and the photographing sensitivity changing function in accordance with the motion of the photographing object. Microcomputer 3 carries out control for continuously shooting the faces of a plurality of photographing objects in optimum conditions, in accordance with the number of faces of the photographing objects, by a single shutter operation, and for assigning serial photographing object numbers to images of the plurality of photographing objects taken by continuous shooting and recording the images in a single continuous-shooting image folder. Furthermore, microcomputer 3 carries out control for continuous shooting in predetermined order, in accordance with the number of faces of photographing objects, and, when the object speed is equal to or higher than a predetermined value, for detecting object speed again after photographing other photographing objects.

Furthermore, for each face of a plurality of photographing objects, microcomputer 3 starts camera shake correction by controlling the camera shake correcting function if the object speed is lower than a threshold, and, if the object speed is equal to or higher than the threshold, increases the gain of the photographing sensitivity changing function more than when the object speed is lower than the threshold, and takes a photograph in shorter exposure time. Details of the photographing control processing will be described later using the flowcharts of FIGS. 6 and 7. Furthermore, microcomputer 3 can receive signals from power switch 35, shutter operation section 36, photographing/playback switching operation section 37, operation cross key 38, MENU setting operation section 39 and SET operation section 40. Microcomputer 3 is an example of the control section of the present invention. Furthermore, microcomputer 3 incorporates memory 130 and stores photographing information about photographing objects (for example, information as to specifically which photographing object in a plurality of photographing objects). Memory 130 may be a nonvolatile memory such as a RAM or EEPROM (electrically erasable programmable ROM) with a power supply backup.

In FIG. 2, casing 1a of digital camera 1 is held by the photographer when the photographing object is photographed. Display section 55, power switch 35, photographing/playback switching operation section 37, operation cross key 38, MENU setting operation section 39 and SET operation section 40 are provided in the back of casing 1a.

Power switch 35 is an operation unit for turning on and off power to digital camera 1. Photographing/playback switching operation section 37 is an operation unit for switching between photographing mode and playback mode and allows the photographer to switch between modes by turning a lever. MENU setting operation section 39 is an operation unit for setting various operations of digital camera 1. Operation cross key 38 is an operation unit where the photographer presses the upper, lower, left and right parts and selects desired menu from various menu screens displayed on display section 55. SET operation section 40 is an operation unit for making various menu displays return to the previous display.

In FIG. 2(A), shutter operation section 36 and zoom operation section 57 are provided on the top surface of casing 1a. Zoom operation section 57 is provided around shutter operation section 36 and is coaxially rotatable with shutter operation section 36. When the photographer operates photographing/playback switching operation section 37 to switch the mode to photographing mode and turns zoom operation section 57 clockwise, the lens group moves toward the telephoto side, and, when the photographer turns zoom operation section 57 counterclockwise, the lens group moves toward the wide-angle side.

Shutter operation section 36 is, for example, a release button operated by the photographer upon taking a photograph. When shutter operation section 36 is operated, a timing signal is outputted to microcomputer 3. Shutter operation section 36 is a two-stage pushdown switch allowing half-press operation and full-press operation, and, when the photographer performs the half-press operation, shutter operation section 36 starts motion detection, photometric processing and distance measuring processing for the photographing object, which will be described later. When the photographer performs the full-press operation, a timing signal is outputted. Shutter control section 41 drives shutter drive motor 42 according to a control signal outputted from microcomputer 3 which having received the timing signal, and operates the shutter.

Returning to FIG. 1 again, the explanation of the configuration of digital camera 1 will be continued. In FIG. 1, flash control section 43 controls the operation of flash lamp 44. Microcomputer 3, having received the timing signal through the operation of shutter operation section 36, outputs a control signal to flash control section 43. According to this control signal, flash control section 43 makes flash lamp 44 emit light. Flash lamp 44 is controlled according to the amount of light received by imaging sensor 4. That is, if the output of the image signal from imaging sensor 4 is equal to or below a predetermined value, flash control section 43 makes flash lamp 44 work with the shutter operation and emit light automatically. By contrast, if the output of the image signal is equal to or above the predetermined value, flash control section 43 controls flash lamp 44 not to emit light.

Flash ON/OFF operation section 56 is provided to control the operation of flash lamp 44 irrespective of the output of imaging sensor 4. That is, flash control section 43 makes flash lamp 44 emit light when flash ON/OFF operation section 56 is turned on, and does not make flash lamp 44 emit light when flash ON/OFF operation section 56 is turned off.

The image signal outputted from imaging sensor 4 is sent from analog signal processing section 6 to A/D conversion section 7, digital signal processing section 8, digital signal amplification section 110, buffer memory 9 and image compression section 10, in sequence, and processed. Analog signal processing section 6 applies analog signal processing such as gamma processing, to the image signal outputted from imaging sensor 4. A/D conversion section 7 converts the analog signal outputted from analog signal processing section 6 into a digital signal. Digital signal processing section 8 applies digital signal processing such as noise cancellation and contour emphasis to the image signal converted to a digital signal by A/D conversion section 7, and outputs the result to motion detecting section 100 and digital signal amplification section 110 through face detection section 120. Buffer memory 9 is a RAM (Random Access Memory) and stores the image signal on a temporary basis.

Digital signal gain setting section 111 sets the amplification gain for the image signal after digital signal processing. Digital signal amplification section 110 amplifies the image signal using the set amplification gain and outputs the signal to buffer memory 9. The setting of amplification gain is equivalent to setting photographing sensitivity. With the present embodiment, photographing sensitivity is expressed in values equivalent to ISO sensitivity and can be set equivalent to photographing sensitivity of ISO80, 100, 200, 400, 800 and 1600, for example. Here, photographing sensitivity that can be set is not limited to these. Furthermore, photographing sensitivity may be expressed in values other than ISO sensitivity equivalents.

Furthermore, the processing of amplifying an image signal is not necessarily performed in digital signal amplification section 110 and may be performed on an analog signal in analog signal processing section 6. Furthermore, the amplification processing may be performed in imaging sensor 4 as well.

The image signal stored in buffer memory 9 is sent from image compression section 10 to image recording section 12, in sequence, and processed. The image signal stored in buffer memory 9 is read out according to a command from image record control section 11 and transmitted to image compression section 10. Data of the image signal transmitted to image compression section 10 is compressed to image signal according to a command from image record control section 11. Through this compression processing, the image signal is reduced to a smaller data size than source data. For example, the JPEG (Joint Photographic Experts Group) scheme is used for the compression method. After that, the compressed image signal is recorded in image recording section 12 by image record control section 11.

Image recording section 12 is, for example, a built-in memory and/or a detachable, removable memory that records the image signal in association with predetermined information to be recorded, based on the command of image record control section 11. The predetermined information to be recorded together with the image signal includes the date and time the image is taken, focal length information, shutter speed information, F-number information and photographing mode information. The predetermined information is given, for example, in the Exif (registered trademark) format or similar formats to the Exif format.

Display section 55 displays an image signal recorded in image recording section 12 or buffer memory 9 in visible image, according to a command from image display control section 13. Here, the display mode of display section 55 includes a display mode in which only image signals are displayed in visible images, and a display mode in which image signals and information upon photographing are displayed in visible images.

AF control section 95 adjusts focus by driving the third lens group L3 through focus drive motor 96 in the optical axis AX direction. Face detection section 120 performs face detection processing on a plurality of photographing objects, and microcomputer 3 performs automatic focusing processing by setting AF areas upon the detected faces of the photographing objects. The AF areas are not limited to the faces of the photographing objects and may be set upon eyes, nose, mouth and so on. Furthermore, the sex and age of the photographing object, or whether or not the photographing object is an animal, is decided by extracting features of the face.

AF control section 95 detects the state of focus in each AF area and calculates an optimum focusing position for the principal photographing object.

Figure 8:
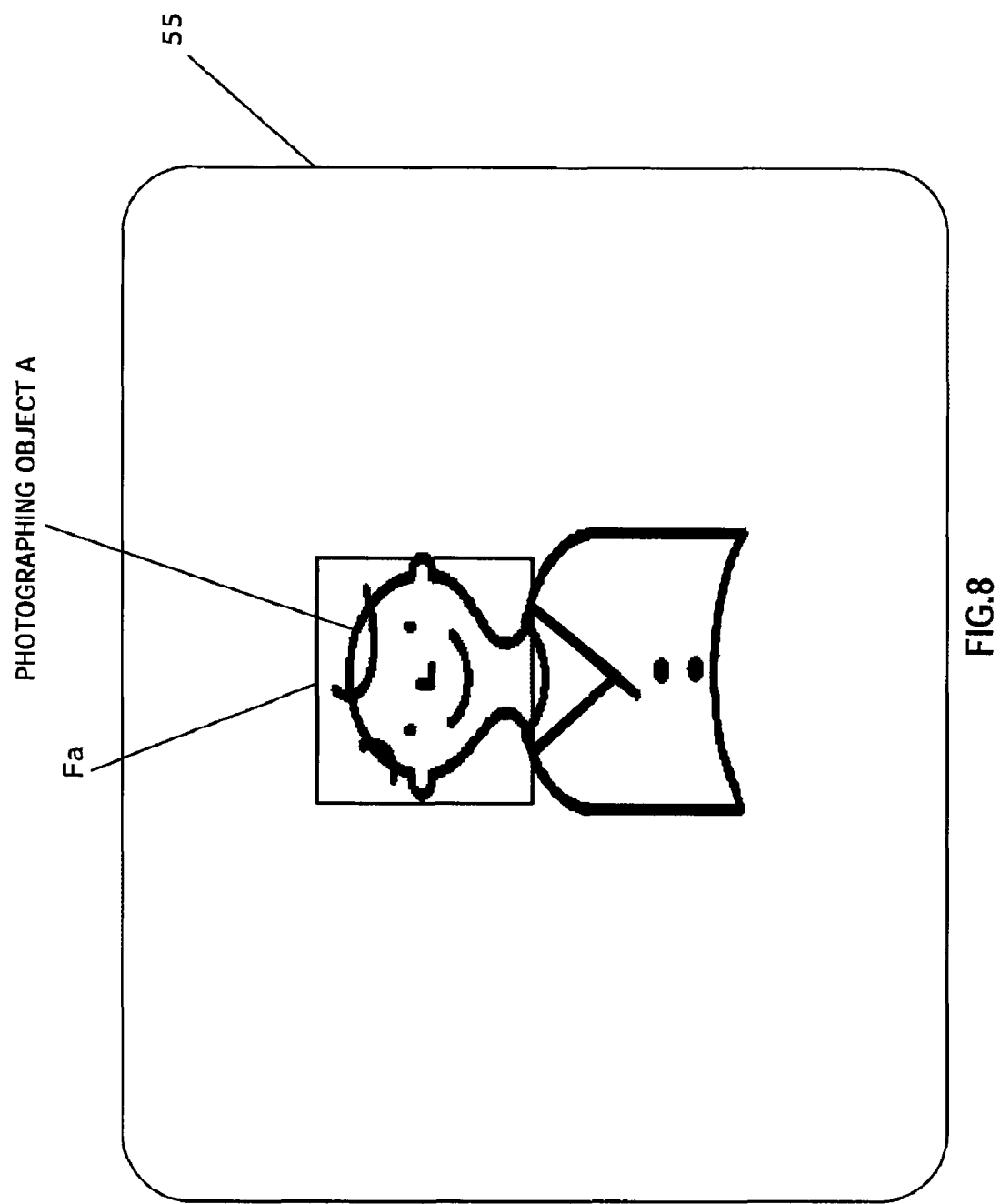
FIG. 8 is an example of an AF area set in the imaging apparatus according to Embodiment 1.

FIG. 8 shows an example of an AF area set by digital camera 1. In FIG. 8, AF area Fa is set with a solid line in a predetermined position in the photographing screen where the face of photographing object A is detected.

Focus drive motor 96 moves the third lens group L3, which is a focus lens, in the optical axis direction, and determines the position of the third lens group L3 where the contrast value in AF area Fa becomes a maximum. The contrast value is obtained by calculating with microcomputer 3 changes in light and dark from the image signal corresponding to the AF area Fa. AF control section 95 calculates an optimum focusing position for the principal photographing object from, example, the magnitude of the contrast value of AF area Fa and weight based on the position of the AF area Fa in the photographing screen. Therefore, the photographer can check in which part on the photographing screen focus is set, from the displayed AF area Fa.

Motion detecting section 100 detects a vector representing the measure of displacement of image between frames in horizontal and vertical directions (hereinafter referred to as "detection vector"), on a per frame basis, based on the image signal converted to a digital signal in AF area Fa. Now, motion detecting section 100 will be explained in detail.

Figure 3:
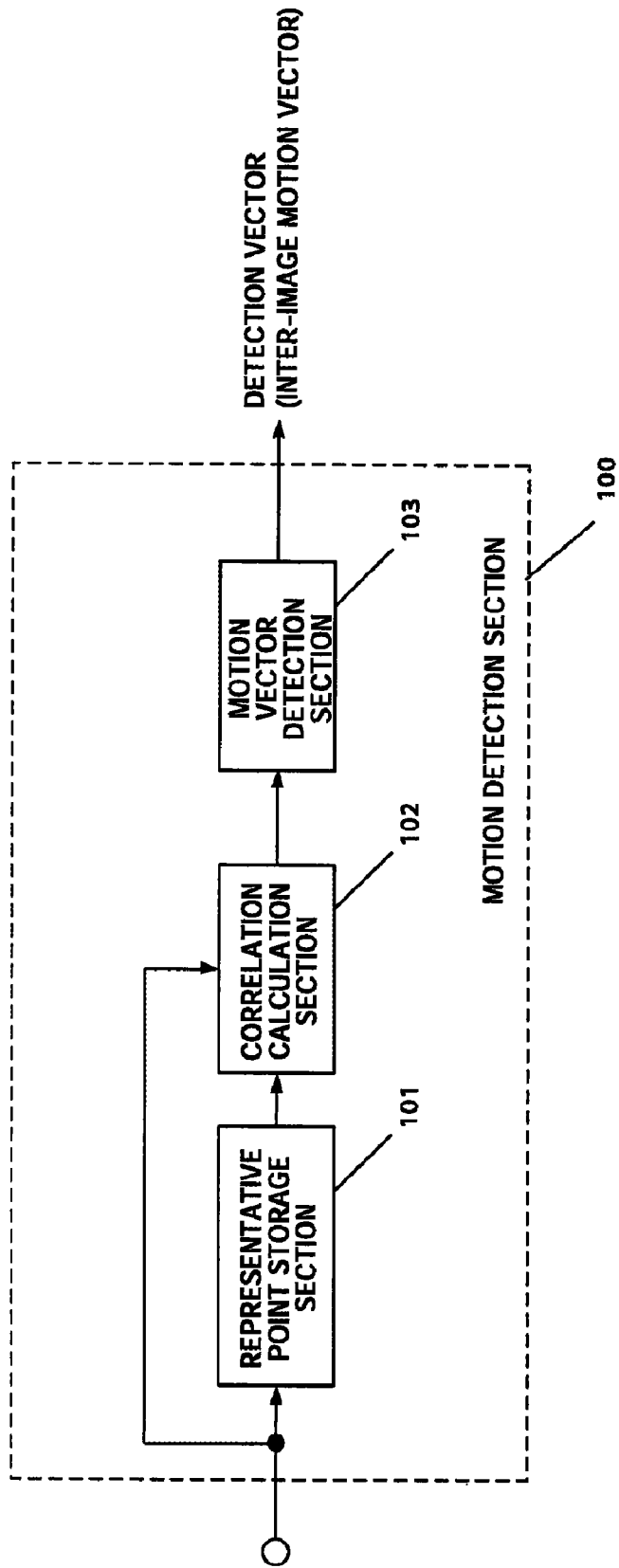
FIG. 3 is a block diagram showing an example of a configuration of a motion detecting section of the imaging apparatus according to Embodiment 1.

FIG. 3 is a block diagram showing an example of the configuration of above-described motion detecting section 100. In FIG. 3, motion detecting section 100 employs a configuration including representative point memory 101, correlation calculation section 102 and motion vector detecting section 103.

Representative point memory 101 divides the image signal of the current frame inputted via A/D conversion section 7 and digital signal processing section 8 into a plurality of segments, and stores image signals corresponding to the specific representative points included in each segment as representative point signals. Furthermore, representative point memory 101 reads out the representative point signals in one frame earlier than the current frame that is already stored, and outputs the signals to correlation calculation section 102.

Correlation calculation section 102 calculates the correlations between the representative signal points of one frame earlier and the representative signal points of the current frame, and determines the differences between the representative signal points. The calculation result is outputted to motion vector detecting section 103.

Motion vector detecting section 103 detects the motion vector of the image between the previous frame and the current frame on a per pixel basis, from the calculation result by correlation calculation section 102. The motion vector is then outputted to microcomputer 3. Microcomputer 3 adjusts the gain and phase of the motion vector and calculates the moving direction and speed of the photographing object in the image signal per unit time.

The processing of detecting the motion of the photographing object is started by, for example, the half-press operation of shutter operation section 36 by the photographer. The start of the processing may also be synchronized with the operation of turning on power switch 35 and switching to photographing mode by operating photographing/playback switching operation section 37 by the photographer.

Figure 9:
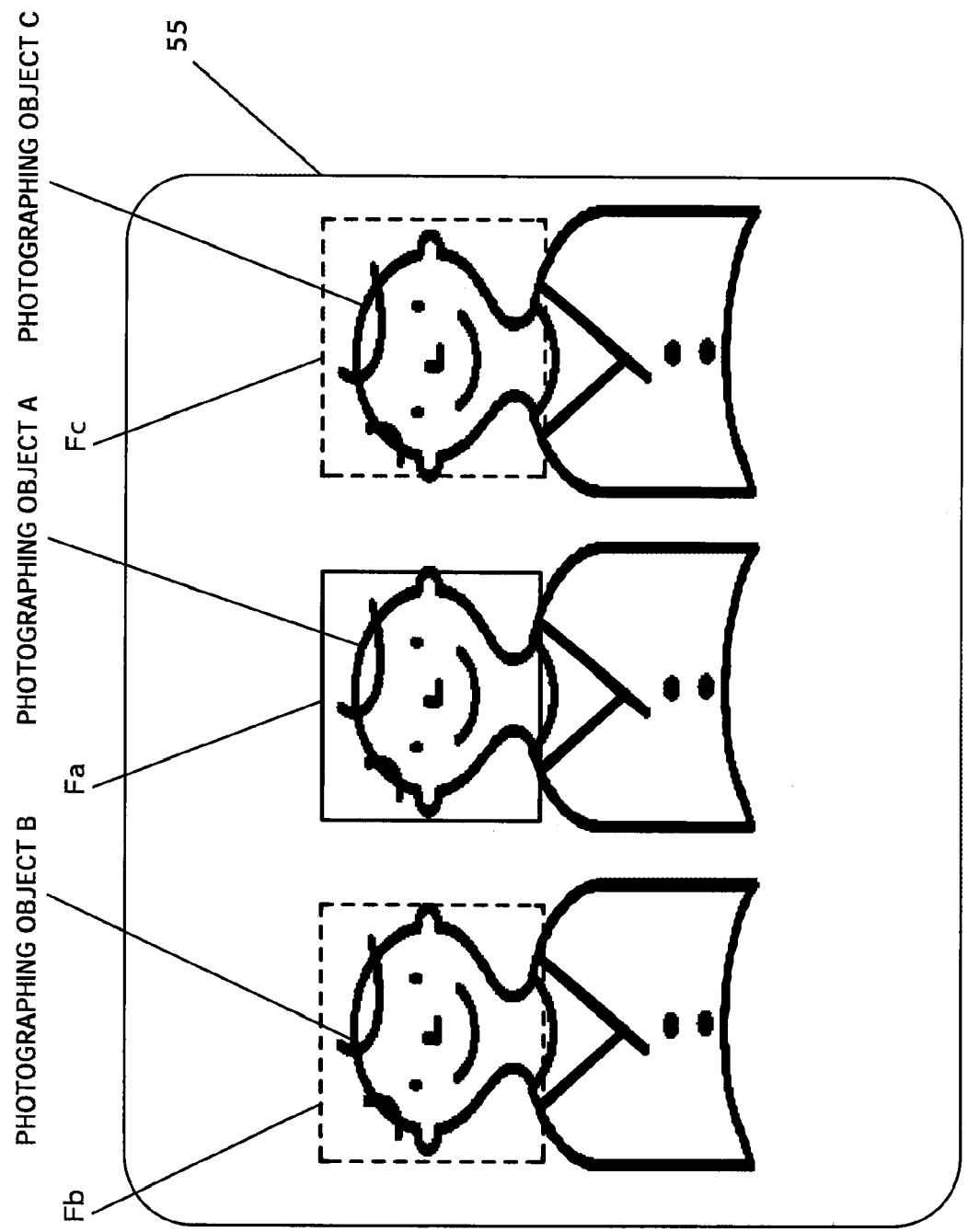
FIG. 9 shows a display example where how face detection processing is carried out is displayed on a display section when a photograph is taken by the imaging apparatus according to Embodiment 1.

FIG. 9 shows a display example where how face detection processing is carried out is displayed on display section 55 when a photograph is taken. In FIG. 9, AF areas Fa, Fb and Fc are set in predetermined positions in the photographing screen where the faces of a plurality of photographing objects A, B and C are detected. With the present embodiment, AF areas of higher priority are shown in a solid line and the rest is shown in a dotted line. This example illustrates a case where object shake does not occur with respect to photographing object A and occurs with respect to photographing objects B and C.

Next, the configuration of camera shake correcting section 16 which implements the camera shake correcting function will be explained. Camera shake correcting section 16 includes position detecting section 15, yawing drive control section 14$x$, pitching drive control section 14$y$, D/A conversion sections 17$x$ and 17$y$, angular velocity sensors 18$x$ and 18$y$ and A/D conversion sections 19$x$ and 19$y$.

Yawing drive control section 14x and pitching drive control section 14y drive the correction lens group L2 in two directions perpendicular to the optical axis AX of the imaging optical system L. Position detecting section 15 detects the position of the correction lens group L2. Above-described position detecting section 15, yawing drive control section 14x and pitching drive control section 14y form a feedback control loop for driving and controlling the correction lens group L2.

Angular velocity sensors 18x and 18y are sensors for detecting the motion of digital camera 1 including the imaging optical system L. Angular velocity sensors 18x and 18y output positive and negative angular velocity signals depending on the direction the digital camera moves, based on the output in a state where digital camera 1 is still. In the present embodiment, two angular velocity sensors are provided for detecting the two directions of the yawing direction and the pitching direction.

The outputted angular velocity signal is converted into a digital signal by A/D conversion sections 19x and 19y via filtering processing and amplification processing, and the result is provided to microcomputer 3. Microcomputer 3 applies filtering, integration processing, phase compensation, gain adjustment and clipping processing to the angular velocity signal in sequence, calculates the amount of drive control of the lens group L2 required for camera shake correction and outputs the calculation result as a control signal. Such a control signal is outputted to yawing drive control section 14x and pitching drive control section 14y through D/A conversion sections 17x and 17y.

Yawing drive control section 14x and pitching drive control section 14y drive the correction lens group L2 by a predetermined amount of drive, according to the control signal, so that it is possible to correct camera shake and reduce image quality degradation.

Figure 4:
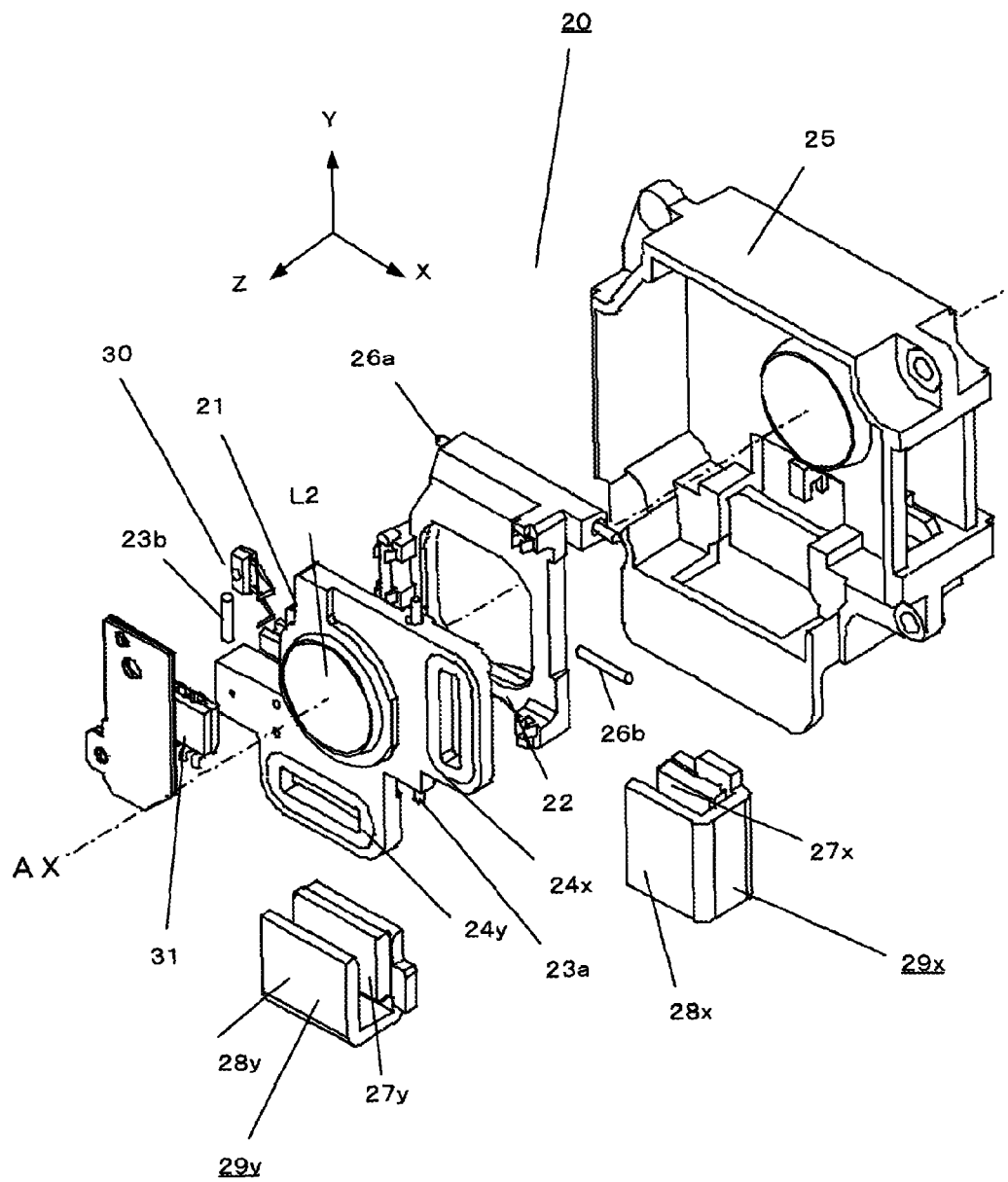
FIG. 4 is an exploded perspective view showing a configuration of a camera shake correcting mechanism in the camera shake correcting section of the imaging apparatus according to Embodiment 1.

FIG. 4 is an exploded perspective view showing the configuration of camera shake correcting mechanism 20 incorporated in camera shake correcting section 16 described above.

Camera shake correcting mechanism 20 employs a configuration comprised mainly of pitching move frame 21, yawing move frame 22, pitching shafts 23a and 23b, coils 24x and 24y, fixing frame 25, yawing shafts 26a and 26b, magnets 27x and 27y, yokes 28x and 28y, actuators 29x and 29y, light emitting element 30 and light receiving element 31.

The correction lens group L2 is fixed to pitching move frame 21. Pitching move frame 21 is held to yawing move frame 22 to be slidable in the Y direction through two pitching shafts 23a and 23b. Furthermore, coils 24x and 24y are fixed to pitching move frame 21. Yawing move frame 22 is held to be slidable in the X direction to fixing frame 25 through yawing shafts 26a and 26b. Magnet 27x and yoke 28x are held to fixing frame 25 and configure actuator 29x with coil 24x. In the same way, magnet 27y and yoke 28y are held to fixing frame 25 and configure actuator 29y with coil 24y. Light emitting element 30 is fixed to pitching move frame 21. Furthermore, light receiving element 31 is fixed to fixing frame 25, receives light emitted from light emitting element 30 and detects a two-dimensional position coordinate. Such light emitting element 30 and light receiving element 31 configure above-described position detecting section 15.

The operation of digital camera 1 having a camera shake correcting function and a photographing sensitivity changing function configured as shown above will be explained below.

First, photographing modes that are available for selection with digital camera 1 will be explained. Photographing modes include, for example, "continuous shooting mode," in which shutter drive motor 42 is operated at 0.3 second intervals and two or more photographs are taken by continuous shooting, "face detection preference mode," "sensitivity increasing mode" and "camera shake correcting mode," which will be described later, and the photographer can select a desired photographing mode. When the photographing mode is selected, microcomputer 3 controls various control sections to support that photographing mode.

Figure 5:
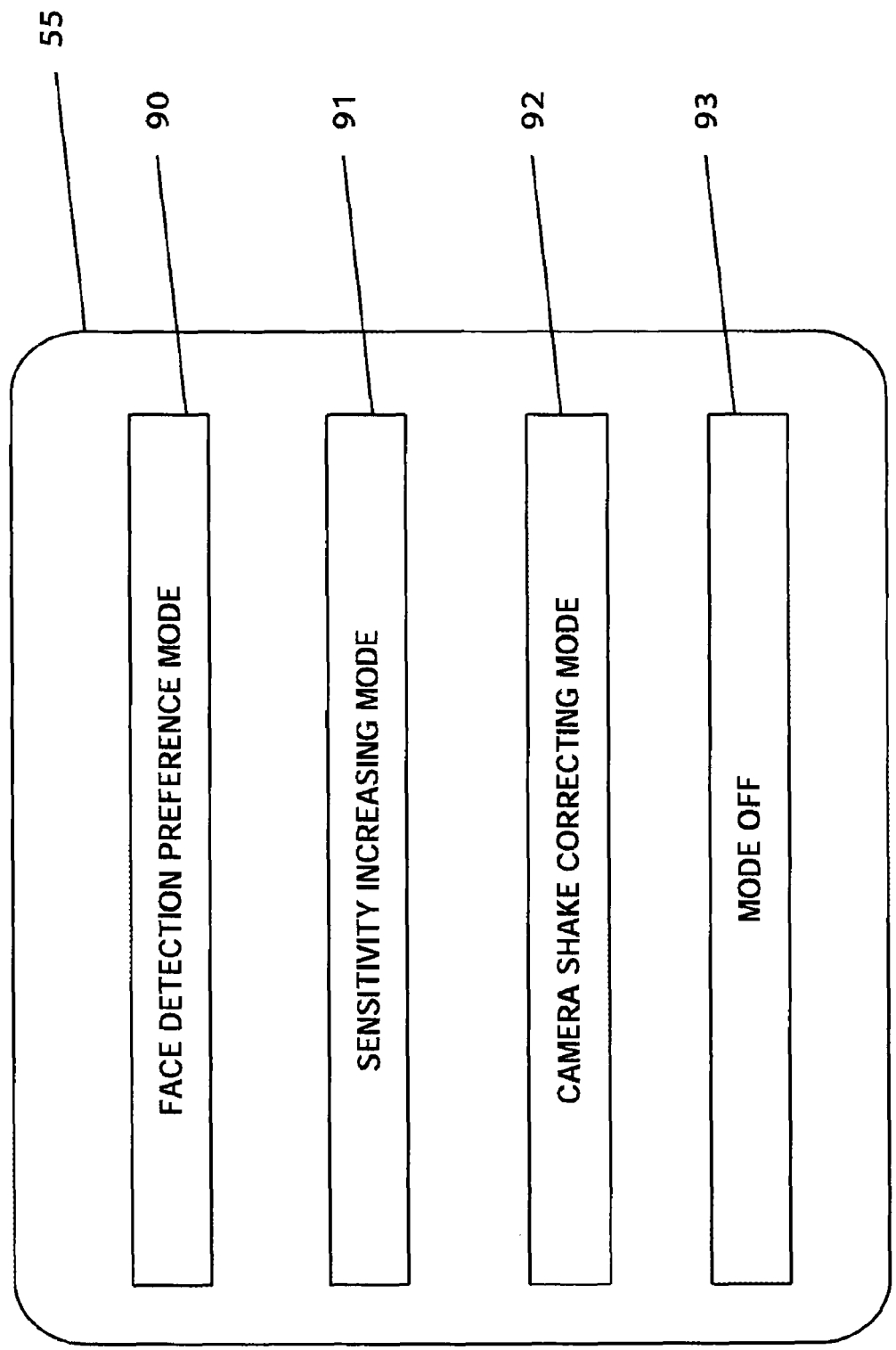
FIG. 5 shows a display example of a photographing mode selecting screen displayed on the display section of the imaging apparatus according to Embodiment 1.

FIG. 5 illustrates a display example of an photographing mode selecting screen displayed on display section 55. The photographing mode selecting screen can be displayed on display section 55 by the photographer operating MENU setting operation section 39 or operation cross key 38. As shown in FIG. 5, photographing modes include "face detection preference mode," "sensitivity increasing mode," "camera shake correcting mode" and "mode OFF," and the photographer can set a desired photographing mode by selecting between respective associated icons 90 to 93. FIG. 5 shows only characteristic photographing mode selecting icons of the present embodiment, but icons for selecting other photographing modes such as "continuous shooting mode" above may be further displayed.

When sensitivity increasing mode selecting icon 91 is selected, the photographing sensitivity is changed to high photographing sensitivity ("sensitivity increasing mode"), which enables higher sensitivity than normal photographing or camera shake correcting mode. That is, digital signal amplification section 110 amplifies an image signal by a predetermined gain according to a command from microcomputer 3. In this way, it is possible to make exposure time shorter and take a photograph at a higher shutter speed, and, consequently, reduce the influence of image shake.

When camera shake correcting mode selecting icon 92 is selected, the camera shake correcting function is started ("camera shake correcting mode"). That is, according to commands from microcomputer 3, camera shake correcting mechanism 20 reduces camera shake by driving the correction lens group L2 in two directions in the plane perpendicular to the optical axis.

When face detection preference mode icon 90 is selected, microcomputer 3 detects the face of the photographing object, and performs fast continuous shooting the same number of times as photographing objects. Furthermore, microcomputer 3 increases the photographing sensitivity according to the moving speed of the photographing object. In this way, when the photographing object moves at such a speed that causes object shake, high photographing sensitivity is set, so that object shake caused by the motion of the photographing object can be reduced.

When mode-off selecting icon 93 is selected, the above-described photographing sensitivity increasing function and the camera shake correcting function do not operate and a photograph is taken in normal mode.

Next, the photographing processing for when "face detection preference mode" is selected, will be explained using the flowcharts of FIG. 6 and FIG. 7.

Figure 6:
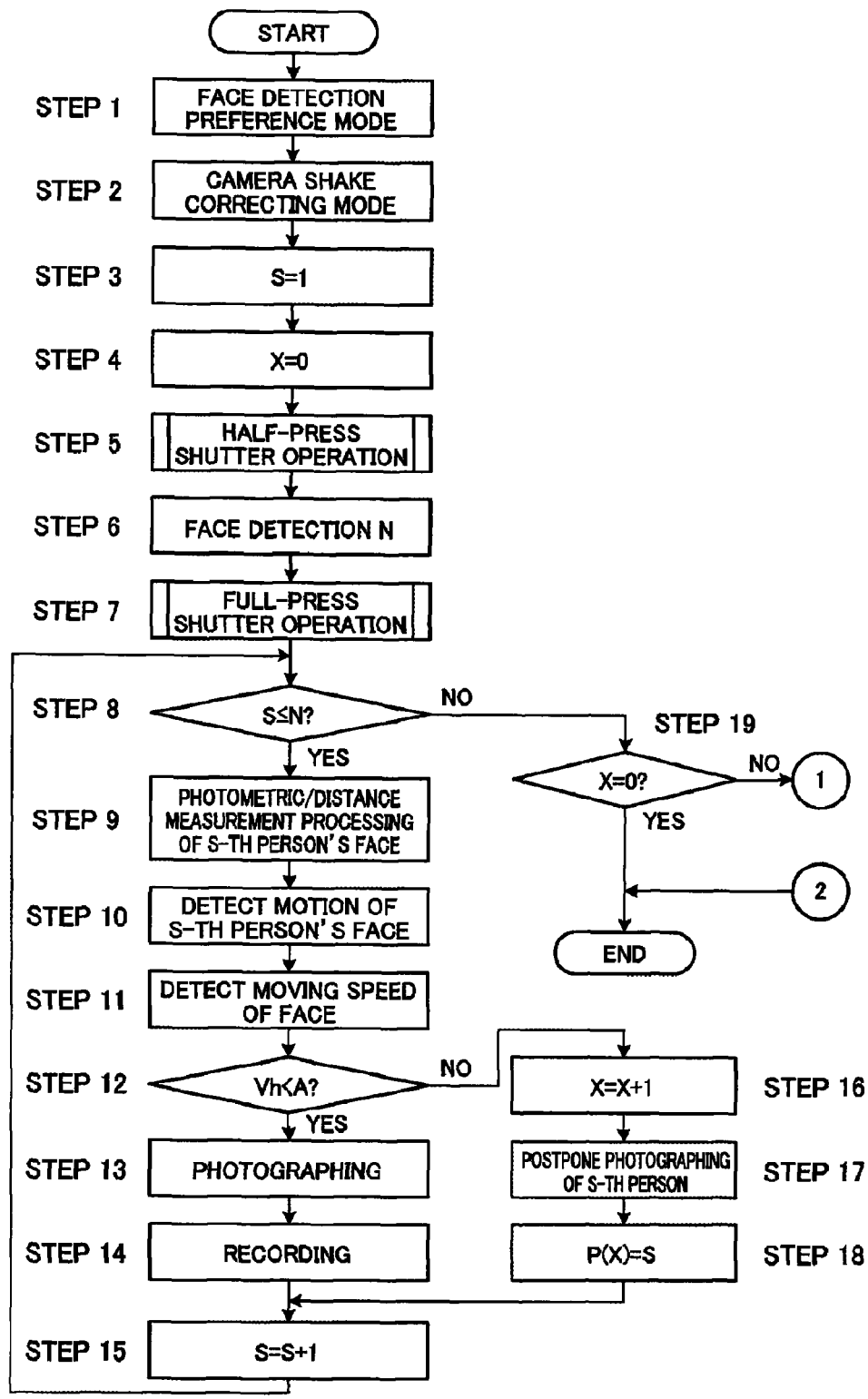
FIG. 6 is a flowchart showing photographing processing by the imaging apparatus according to Embodiment 1.
Figure 7:
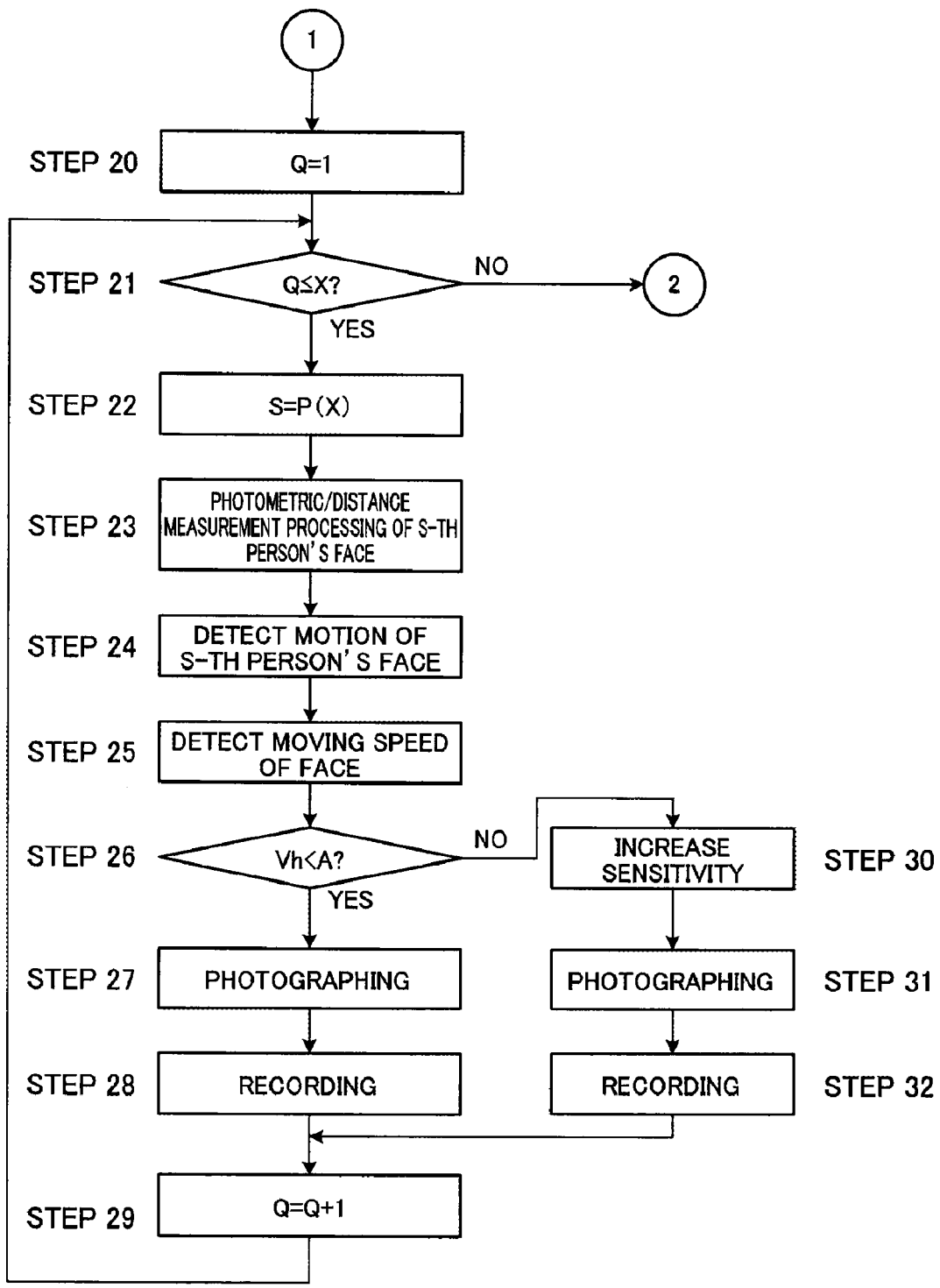
FIG. 7 is a flowchart showing photographing processing by the imaging apparatus according to Embodiment 1.

FIG. 6 and FIG. 7 are flowcharts showing the photographing processing of digital camera 1 executed by microcomputer 3. This flow starts when power switch 35 of digital camera 1 is operated "on."

In the processing in step 1, when the photographer operates MENU setting operation section 39 provided in the back of casing 1a of digital camera 1, a list of photographing modes is displayed on display section 55. When the photographer selects face detection preference mode icon 90 amongst the photographing mode selecting icons displayed, the process moves to step 2 and "camera shake correcting mode" is started.

In step 2, microcomputer 3 changes the photographing mode to "camera shake correcting mode" and starts camera shake correcting section 16 and camera shake correcting mechanism 20. Camera shake correcting section 16 detects camera shake occurring with the camera through angular velocity sensors 18x and 18y. According to a command from microcomputer 3, a current is supplied to coils 24x and 24y of pitching move frame 21 from an external circuit, and the magnetic circuit comprised of actuators 27x and 27y makes pitching move frame 21 and the correction lens group L2 move in two directions X and Y in the plane perpendicular to the optical axis AX. In this case, light receiving element 31 detects the position of pitching move frame 21, thereby enabling position detection with high accuracy.

In step 3, the variable S in "face detection preference mode" is reset (S=1), and, in step 4, the variable X in "face detection preference mode" is reset (X=0).

In step 5, upon recognizing the half-press operation in shutter operation section 36 by the photographer, microcomputer 3 moves the process to step 6.

In step 6, the face of the photographing object is detected. As for the method of face detection, there is, for example, a method of detecting contour information in a photographed image and detecting whether or not there are features (e.g., eyes, nose, mouth, etc.) with the detected contour. When the detected contour shows features, face detection section 120 decides that there is a face. With this face detection of step 6, the number of photographing objects is recognized and counted to give the total number of photographing objects N.

Figure 10:
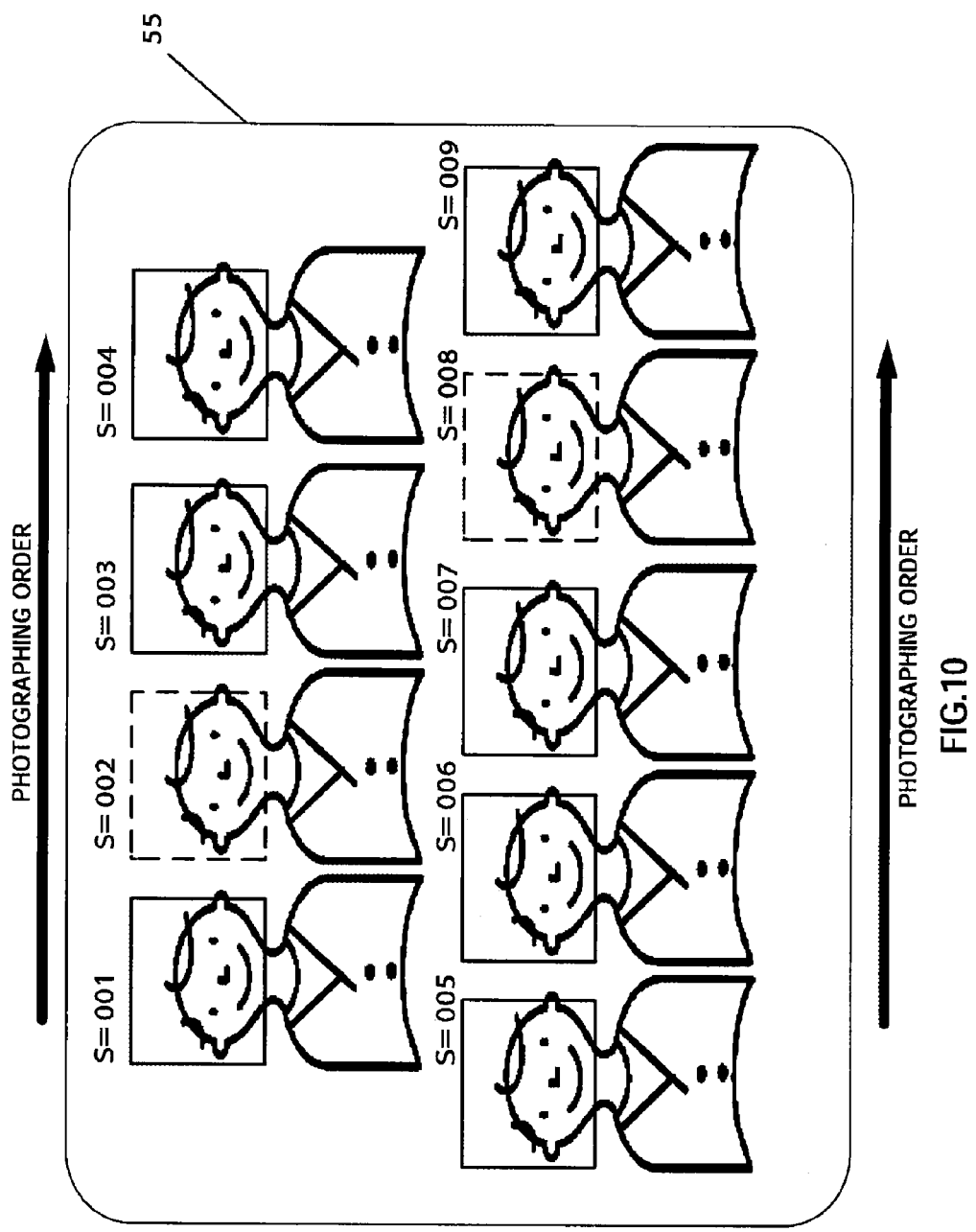
FIG. 10 shows a display example where how face detection processing is carried out is displayed on a display section when a photograph is taken by the imaging apparatus according to Embodiment 1.

FIG. 10 is a display example where how face detection processing is performed when a photograph is taken, is displayed on display section 55. FIG. 10 shows a case where the total number of photographing objects N is 9 and the photographing objects are numbered respectively from S=001 to 009. Microcomputer 3 records these numbers 001 to 009 assigned to the photographing objects with the photographing object numbers assigned respectively to the photographing objects and the photographed image, in image recording section 12. Furthermore, the position for each photographing object where the face is detected, maybe marked in a rectangular solid line.

In step 7, upon recognizing the full-press operation in shutter operation section 36 by the photographer, microcomputer 3 decides whether or not the variable S for the number of photographing objects to be photographed in step 8 is equal to or smaller than the total number of photographing objects N detected in step 6. When the number of photographing objects to be photographed is equal to or smaller than the total number of photographing objects N detected in the face detection of step 6, microcomputer 3 decides that not all the photographing objects have been photographed yet, and carries out the series of processing of next step 9 to step 15, for the first to Nth person, and, when S is greater than N, decides that all the photographing objects have been photographed and thereupon moves the process to step 19.

In step 9, photometric processing and distance measurement processing are carried out with respect to the S-th photographing object. In the photometric processing, digital signal processing section 8 calculates the exposure value based on the image signal outputted from imaging sensor 4. Microcomputer 3 automatically sets adequate shutter speed based on the calculated exposure value. Furthermore, in the distance measuring processing, AF control section 95 adjusts focus by moving the lens groups in the optical axis directions such that the contrast value of the image signal shows a peak. Here, since these photometric processing and distance measurement processing are applied to the photographing objects individually, each photographing object is photographed in optimum exposure and distance measurement conditions.

In step 10, the motion of the face of the S-th photographing object is detected. In this face motion detection processing, motion detecting section 100 detects the motion of the object to be photographed by tracking the representative points of the photographed image, and outputs a motion vector. Furthermore, the motion detection processing is performed at the same time as the photometric processing and the distance measuring processing. In the photometric processing, digital signal processing section 8 calculates the exposure value based on the image signal outputted from imaging sensor 4. Microcomputer 3 automatically sets adequate shutter speed based on the calculated exposure value. Furthermore, in the distance measuring processing, AF control section 95 adjusts focus by moving the lens groups in the optical axis directions such that the contrast value of the image signal shows a peak. Furthermore, when the face of the photographing object cannot be detected, "face detection preference mode" is terminated and photographing is continued in normal "camera shake correcting mode."

Here, when the motion of the face of the photographing object is detected, since camera shake has been corrected earlier, the motion can be detected in a state of reduced influence of camera shake, so that the accuracy of motion detection is improved. That is, it is possible to decide whether the motion of the image in imaging sensor 4 is caused by the motion of the photographing object or is influenced by the motion of the camera caused by camera shake by the photographer.

In step 11, microcomputer 3 calculates the moving speed Vh of the face of the photographing object per unit time from the motion vector detected by motion detecting section 100.

In step 12, the moving speed Vh is identified. A threshold A is registered in advance in digital camera 1, and microcomputer 3 compares the moving speed Vh with this threshold A. Here, this threshold A represents a threshold at which object shake occurs and may be a camera-specific value or may be set at the photographer's disposition. For example, when the flash lamp 44 used, shutter speed can be made faster, so that photographing sensitivity does not increase more than necessary by increasing the threshold. On the other hand, when taking a photograph of a child or pet who/which is likely to move suddenly during the period after the object speed is calculated until the time a photograph is taken, it is also possible to adopt a method of additionally providing digital camera 1 with child photographing mode or pet photographing mode, so that, when the photographer selects that mode, the threshold is decreased and priority is given to increasing photographing sensitivity. On the other hand, when taking a photograph of a night view or when taking a photograph in a dark room, if the distance to the photographing object is too far for flash lamp light to reach, or, if the focal length is long and the influence of camera shake is significant as in the case of telephotography, it is also possible to decrease the threshold and give priority to photographing sensitivity, according to the distance to the photographing object or the focal length. Furthermore, the threshold may be made variable depending on image quality set when taking a photograph. For example, when photographing in the highest image quality (for example, the RAW file format (non-compressed file)), the threshold is increased to prevent image quality degradation due to increase of photographing sensitivity, and, when photographing in standard image quality, priority may be given to increasing photographing sensitivity by decreasing the threshold.

If the comparison result shows that the moving speed Vh is equal to or higher than the threshold A, microcomputer 3 decides that the photographing object is moving at a speed that causes object shake, and moves the process to step 16. On the other hand, if the moving speed Vh is lower than the threshold A, microcomputer 3 decides that the photographing object will not cause object shake, and moves the process to step 13. In the situation where object shake does not occur, ISO sensitivity, which is photographing sensitivity, is set to 64 or equivalent, and the shutter speed is set to 1/30 second. In motion detection for the photographing object, it is also possible to detect, for example, the motion of eyes, instead of the whole face, and decide, if the object blinks and closes the eyes, that the photographing object has moved and move the process to step 16.

In step 13, photographing processing is performed. That is, in the photographing processing, a photographing object image is formed in imaging sensor 4 and an image signal is outputted, and the outputted image signal is displayed on display section 55.

In step 14, the image signal is recorded with a photographing object number in image recording section 12, and thereupon the photographing processing is finished. Especially when the image signal is recorded, the photographing object number is also recorded simultaneously. Image recording section 12 records images of a plurality of photographing objects, taken by continuous shooting, in a single continuous-shooting image folder, and stores an image of a specific photographing object among the images of a plurality of photographing objects stored in the continuous-shooting image folder, as a representative image for the continuous-shooting image folder.

In step 15, the variable S is incremented (S=S+1) to photograph the next photographing object (the (S+1)th person), and the process returns to step 8.

On the other hand, when the moving speed Vh is equal to or higher than the threshold A in step 12, the variable X in "face detection preference mode" is incremented (X=X+1) in step 16, and, in step 17, photographing of the S-th photographing object in step 17 is put off, that is, postponed. In this case, if the photographing object is moving, the photographer may wait until the photographing object stops moving or wait a predetermined period (idle period). This waiting period may be variable depending on the number of faces of photographing objects. This is intended to improve effectiveness when giving a chance to wait until motion is stopped.

In step 18, the fact that the S-th photographing object has not been photographed yet, is stored in memory 130. In the display example of FIG. 10, when the total number of photographing objects N is 9, the photographing objects are numbered respectively from S=001 to 009. The faces of photographing objects that have not been photographed yet are circled by a dotted line, and, in this example, it is shown that the second and eighth photographing objects (S=002 and S=008) have not been photographed. To inform the photographer of which photographing objects have not been photographed yet, rectangular markings may be shown in a dotted line as described above or colors may be changed.

Returning to the flow of FIG. 6, in step 19, to which the process jumped from step 8 earlier, when there is no photographing object that has not been photographed yet, that is, when photographing of all photographing objects subjected to face detection is finished, and thereupon this series of photographing processes is finished. On the other hand, if there is still an unphotographed object, the process moves to step 20 in FIG. 7. The flow in FIG. 7 shows a method of photographing processing for a photographing object that has not been photographed yet through the series of processing shown in FIG. 6.

In step 20, the variable Q indicating an unphotographed object is set to the initial value (Q=1), and, in step 21, a comparison is made between the variable Q indicating an unphotographed object and the variable X in "face detection preference mode," and it is decided whether or not there is any unphotographed object left. When Q≦X, it is decided that there is still an unphotographed object left and the process moves to step 22. On the other hand, when Q>X, it is decided that there is no more unphotographed object and the process moves to the end of the flow in FIG. 6, and thereupon a series of photographing processing is finished.

When an unphotographed object is left, which photographing object has not been photographed is read from memory 130 in step 22 (S=P(X)), and the motion of the face of the S-th photographing object is detected again in step 23. In the example of FIG. 10, the fact that photographing of the second and eighth photographing objects (S=002 and S=008) is not finished, is stored in memory 130.

In step 23, photometric processing and distance measurement processing are performed with respect to the S-th photographing object. These photometric processing and distance measurement processing are the same as the photometric processing and distance measurement processing in step 9. That is, in the photometric processing, digital signal processing section 8 calculates the exposure value based on an image signal outputted from imaging sensor 4. Microcomputer 3 automatically sets adequate shutter speed based on the calculated exposure value. Furthermore, in the distance measuring processing, AF control section 95 adjusts focus by moving the lens groups in the optical axis directions such that the contrast value of the image signal shows a peak. Since the photometric processing and distance measurement processing are performed for each photographing object, each photographing object is photographed in optimum exposure and distance measurement conditions.

In step 24, the motion of the face of the S-th photographing object is detected. This detection of the motion of the face of the S-th photographing object is the same as the detection of the face of the photographing object in step 10.

In step 25, microcomputer 3 calculates the moving speed Vh of the face of the photographing object per unit time from the detection vector detected by motion detecting section 100.

In step 26, the moving speed Vh is identified. The calculation of the moving speed Vh of the face of the S-th photographing object and the decision process for the moving speed Vh are the same as the calculation of the moving speed Vh of the face of the photographing object in step 11 and the decision process for the moving speed Vh in step 12. A threshold A is registered in advance in digital camera 1, and microcomputer 3 compares the moving speed Vh with this threshold A. When the comparison result shows that the moving speed Vh is lower than the threshold A, microcomputer 3 decides that object shake will not occur, and moves the process to step 27. In this situation where object shake does not occur, ISO sensitivity, which is photographing sensitivity, is set to 64 or equivalent and shutter speed is set to 1/30 second or equivalent. On the other hand, when the moving speed Vh is equal to or higher than the threshold A, microcomputer 3 decides that the photographing object is moving at a speed that causes object shake, and moves the process to step 30.

When the moving speed Vh is lower than the threshold A, microcomputer 3 decides that object shake does not occur, and performs photographing processing in step 27. In the photographing processing, a photographing object image is formed in imaging sensor 4 and an image signal is outputted, and the outputted image signal is displayed on display section 55.

In step 28, the image signal is recorded in image recording section 12 with a photographing object number, and thereupon the photographing processing is finished.

In step 29, the variable Q is incremented (Q=Q+1) to photograph the next photographing object that has not been photographed yet, and the process returns to step 21.

On the other hand, when the moving speed Vh is equal to or higher than the threshold A in step 26, microcomputer 3 decides that the photographing object is moving at a speed that causes object shake, and changes the photographing mode to photographing sensitivity increasing mode in step 30. That is, digital signal gain setting section 111 sets gain so as to achieve high photographing sensitivity. Here, microcomputer 3 sets the photographing speed according to the moving speed of the face of the photographing object. Therefore, microcomputer 3 calculates shutter speed that will not cause object shake from the moving speed Vh of the face of the photographing object, and sets photographing sensitivity at which the object can be photographed applying that shutter speed. For example, photographing sensitivity is set to ISO sensitivity 400 or equivalent according to the moving speed of the face of the photographing object. Incidentally, an upper limit may be set to photographing sensitivity such as ISO sensitivity 1600 or equivalent, to suppress degradation of photographed image quality.

In step 31, photographing processing at high sensitivity is performed. A photographing object image is formed in photographing sensor 4 and an image signal is outputted, and this image signal outputted from digital signal processing section 8 is amplified by the gain set in step 30.

In step 32, the image signal is recorded in image recording section 12 with a photographing object number, and thereupon the photographing processing is finished.

In step 21, when all photographing objects have been photographed (when the second and eighth photographing objects have been photographed, in the example of FIG. 10), the process moves to the end of the flow of FIG. 6, and thereupon all photographing modes are finished.

In this way, for each of the plurality of photographing objects, if the moving speed Vh of the face of photographing object is lower than the threshold A, photographing sensitivity is not changed and the camera shake correcting function is started. This reduces camera shake and allows an image of high quality to be taken. Furthermore, for each of the plurality of photographing objects, if the moving speed Vh of the face of the photographing object is equal to or higher than the threshold A, high photographing sensitivity is set. By this means, exposure time can be made shorter and a photograph can be taken at a high shutter speed, so that object shake can be prevented.

Next, a method of managing photographed image files will be explained.

Figure 11:
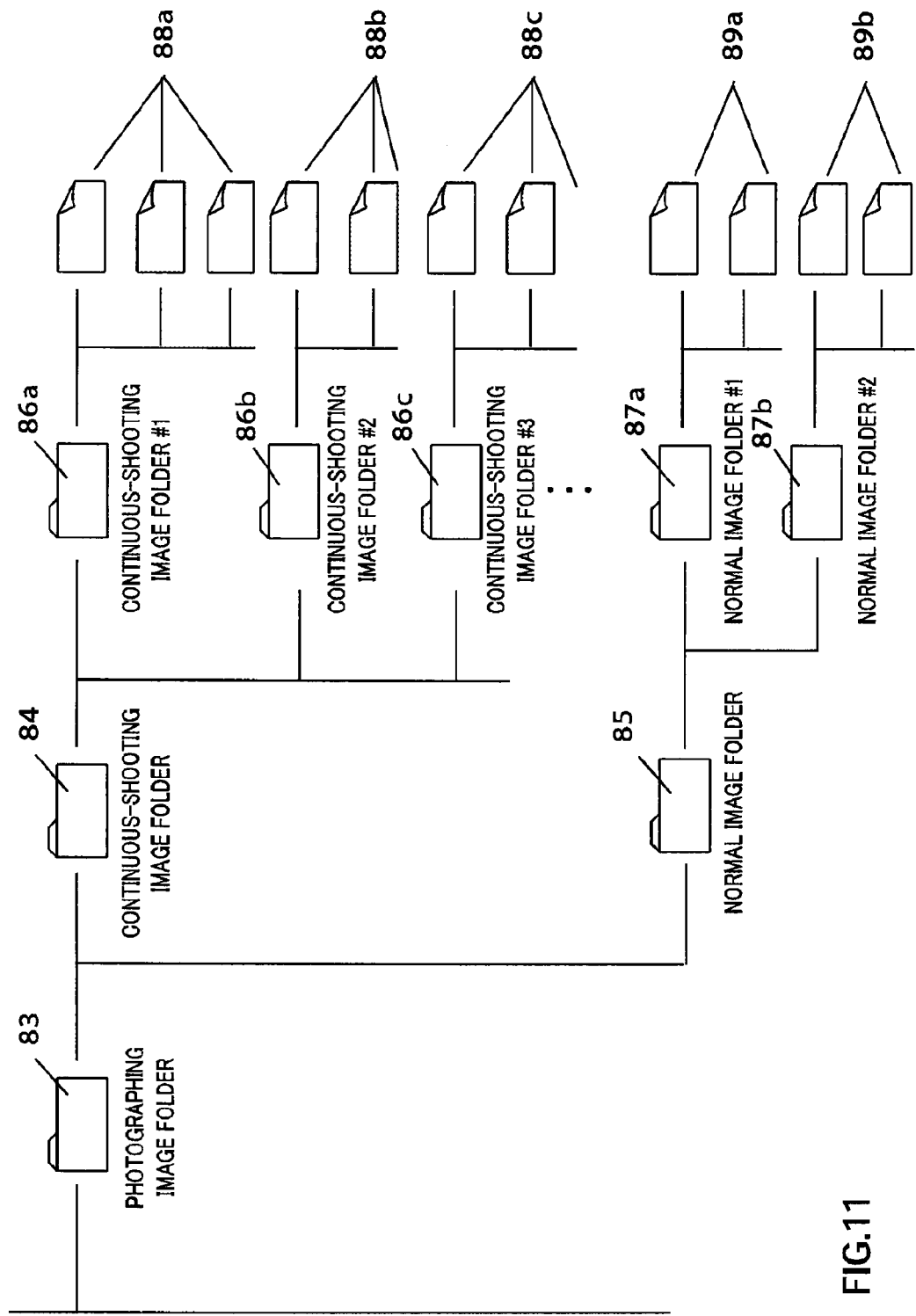
FIG. 11 illustrates a method of managing image files taken by the imaging apparatus according to Embodiment 1.
Figure 12:
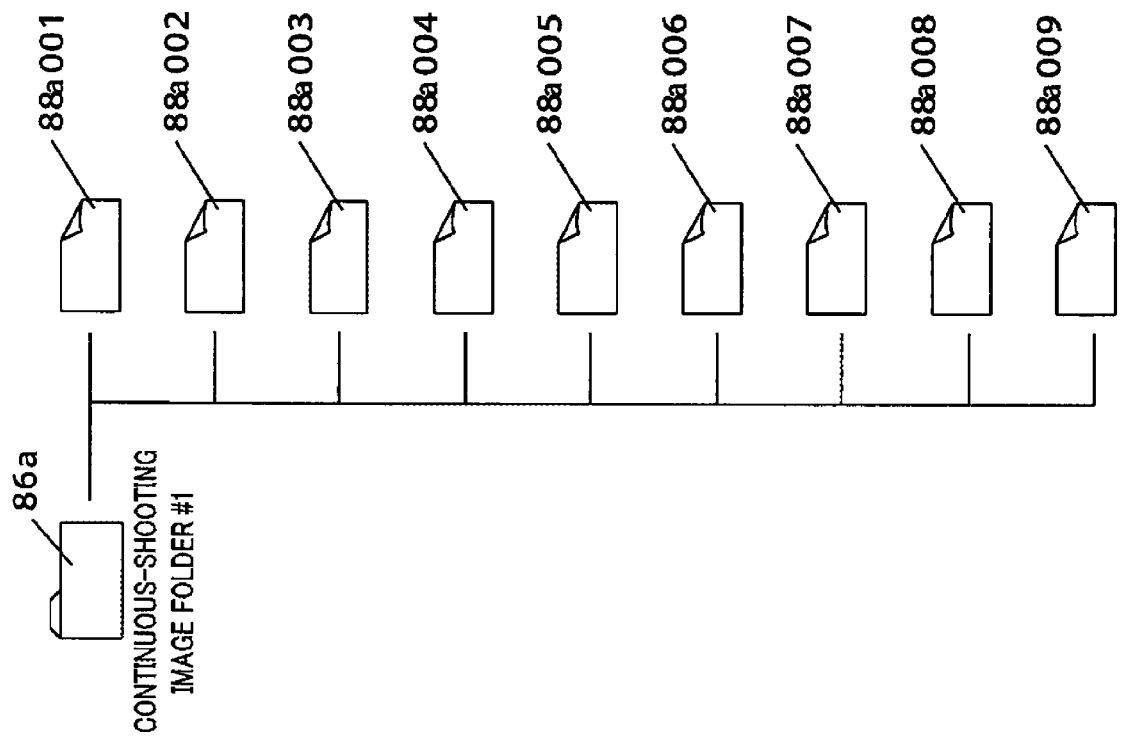
FIG. 12 illustrates a method of managing image files continuously taken by the imaging apparatus according to Embodiment 1.

FIG. 11 and FIG. 12 illustrate the method of managing photographed image files, where FIG. 11 illustrates a method of managing photographed image files and FIG. 12 illustrates a method of managing continuously-shot image files.

In FIG. 11, microcomputer 3 creates a photographed image folder 83 in image recording section 12, which is an internal memory, and creates continuous-shooting image folder 84 and normal image folder 85 in lower hierarchy. Furthermore, continuous-shooting image folders #1, #2, #3 . . . , are formed in lower hierarchy of continuous-shooting image folder 84, and normal folders #1, #2 . . . , are formed in lower hierarchy of normal image folder 85. A series of a plurality of images photographed in continuous shooting mode are stored as image files 88a, 88b, 88c . . . , in continuous-shooting image folder #1, #2, #3 . . . , with respective photographing object numbers. On the other hand, in normal photographing mode, photographed images are stored in normal image folders #1, #2 . . . , as image file 89.

Furthermore, continuous-shooting image folder #1 will be explained in detail. In FIG. 12, continuous-shooting image folder #1 records nine images photographed in one continuous shooting and assigned file names 88a001, 88a002 . . . , in chronological order of photographing.

The present embodiment assumes that the number of images photographed in one continuous shooting is nine, but this is by no means limiting. The point is to save all images photographed in one continuous shooting. That is, when "face detection preference mode" is set, if the faces of a plurality of photographing objects are detected, multiple photographing objects are photographed in one continuous shooting in optimum photographing mode for each photographing object, and all the images photographed in one continuous shooting are saved with respective photographing object numbers in continuous-shooting image folder 86a. In this example, nine photographed images 88a001, 88a002 . . . , are saved in continuous-shooting image folder #1. Likewise, a plurality of images photographed in one continuous shooting are also recorded in continuous-shooting image folders #2 and #3.

Again, the point here is to save all images photographed in one continuous shooting, and the location where these photographed images are saved is by no means limited. The saving location is not limited to image recording section 12 of above-described digital camera 1 and photographed images may be saved in removable memory 51 as well, which will be described later with reference to FIG. 20. In the case of removable memory 51, which will be described later, similar to image recording section 12, microcomputer 3 creates photographed image folder 83, creates continuous-shooting image folder 84 and normal image folder 85 in lower hierarchy, and creates continuous-shooting image folders #1, #2, #3 . . . , in lower hierarchy of continuous-shooting image folder 84 and normal folders #1, #2 . . . , in lower hierarchy of normal image folder 85.

Next, a playback method for displaying a photographed image taken with digital camera 1 on display section 55, will be explained.

Figure 13:
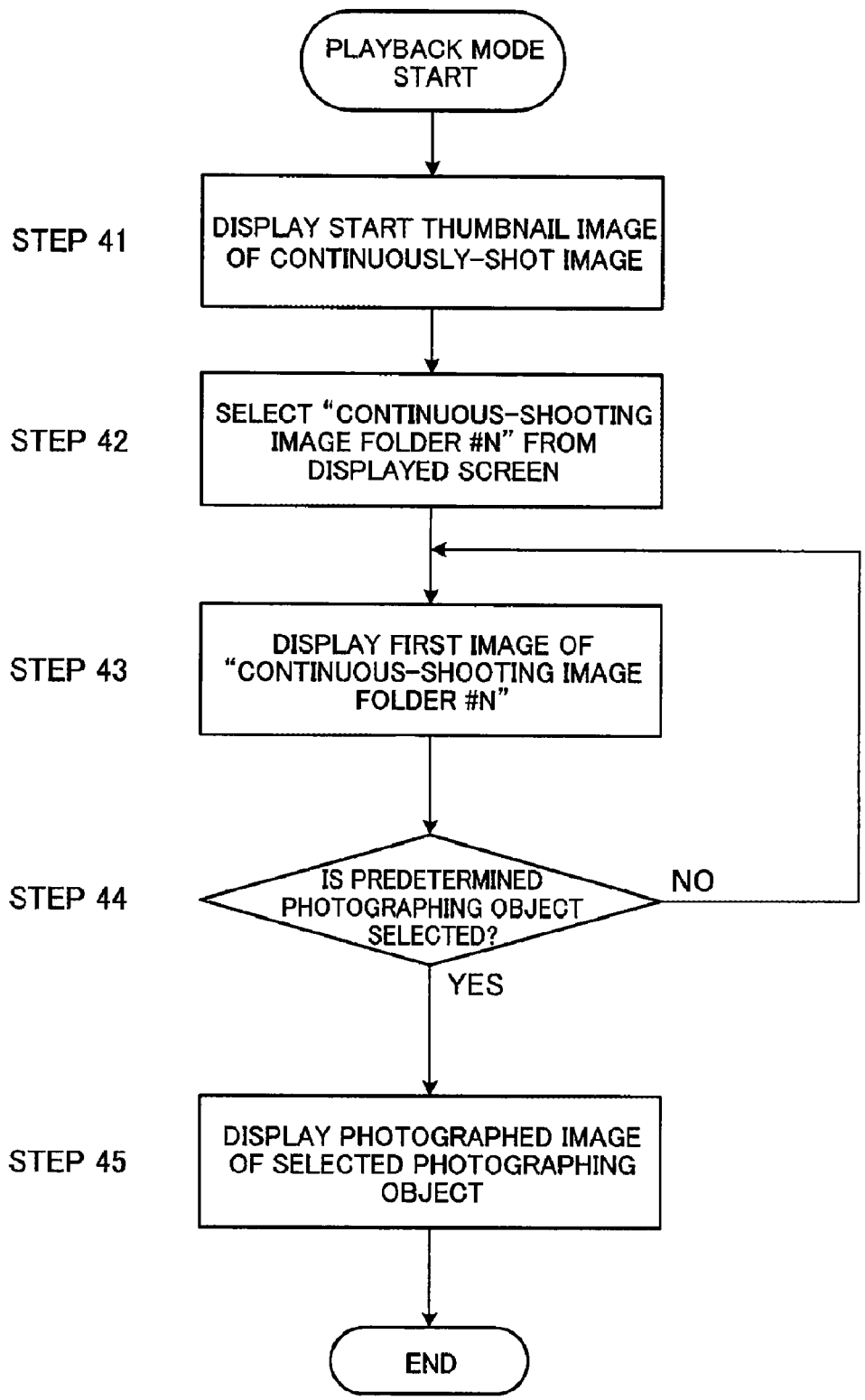
FIG. 13 is a flowchart showing a method of playing back images photographed by the imaging apparatus according to Embodiment 1.

FIG. 13 is a flowchart illustrating a method for playing back a photographed image, which is implemented by microcomputer 3.

This flow is started when power switch 35 of digital camera 1 is operated "on" and photographing/playback switching operation section 37 is changed to playback mode.

The photographer turns on power switch 35 to display photographed images in thumbnails in display section 55 for each image folder, and then switches photographing/playback switching operation section 37 to playback mode.

In step 41, microcomputer 3 displays the first thumbnail image of continuously-shot images.

Figure 14:
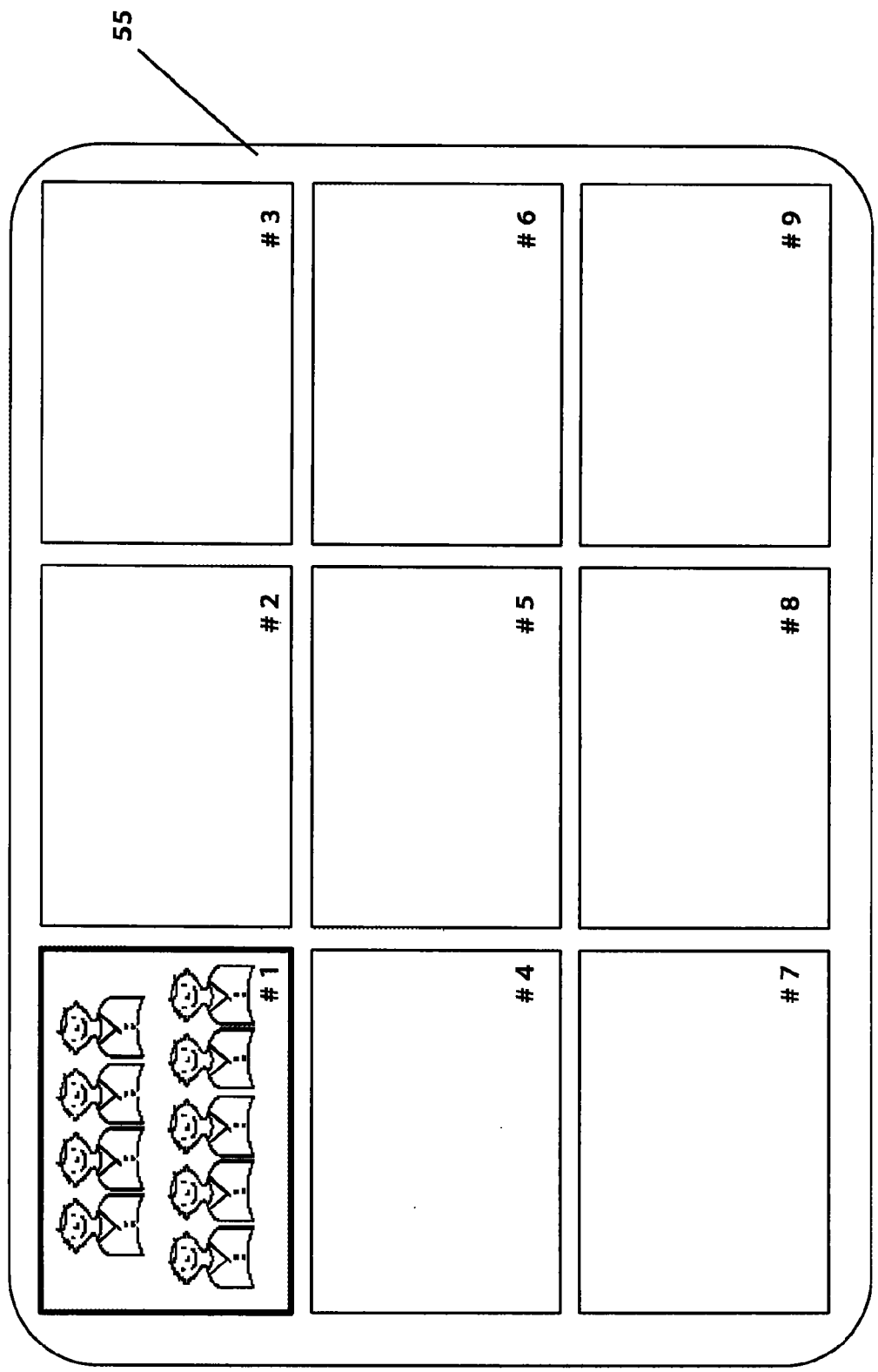
FIG. 14 shows the display section when images continuously taken by the imaging apparatus according to Embodiment 1 are displayed in thumbnails for each image folder.
Figure 15:
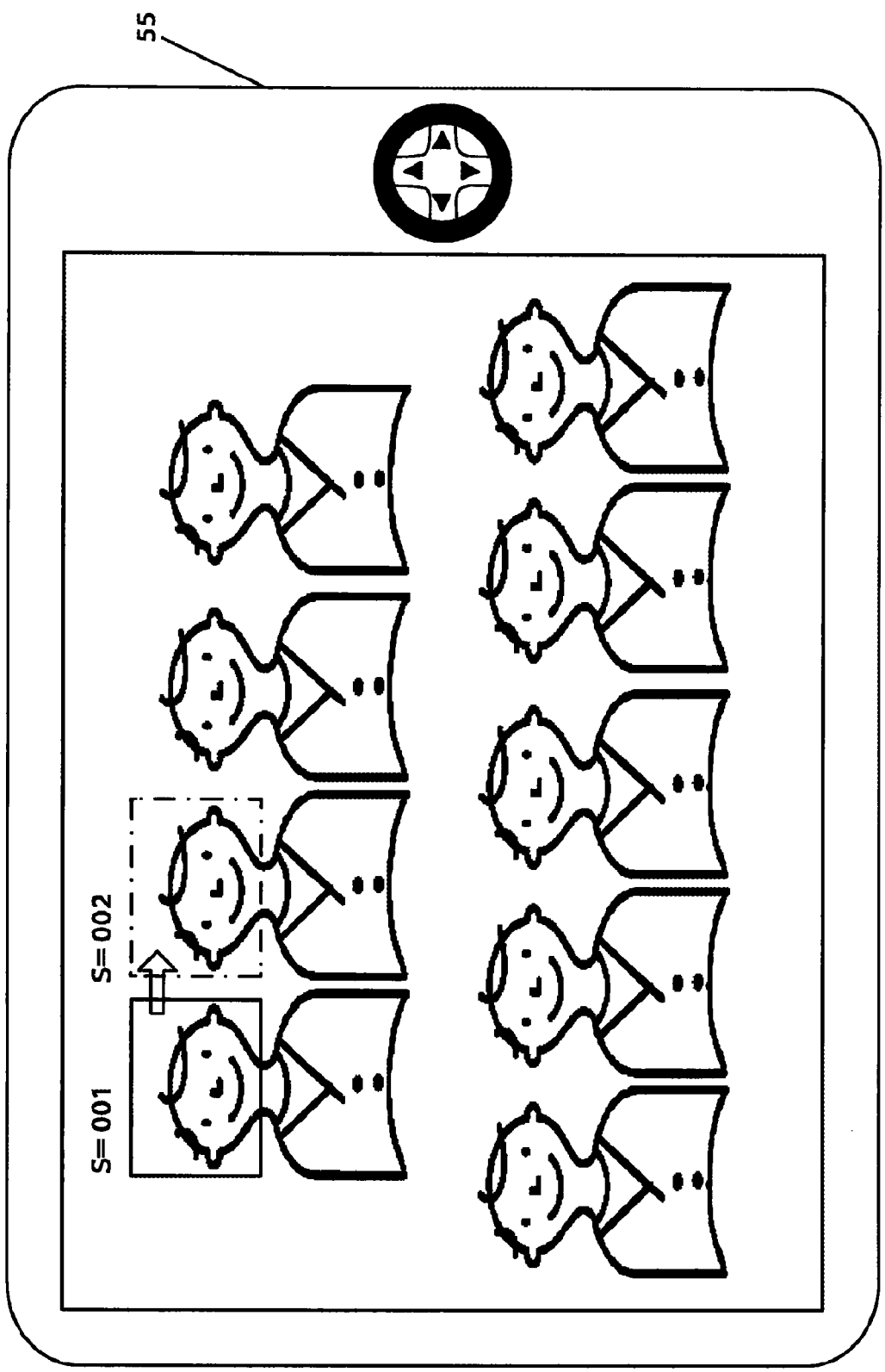
FIG. 15 shows the display section when the first photographed image in continuous-shooting image folder #1 of the imaging apparatus according to Embodiment 1 is displayed.

FIG. 14 shows display section 55 where continuously-shot images are displayed in thumbnails for each image folder. Furthermore, FIG. 15 shows display section 55 when the first photographed image in continuous-shooting image folder #1 is displayed. Image recording section 12 of digital camera 1 or removable memory 51 saves all images photographed in one continuous shooting. Therefore, microcomputer 3 can make image display control section 13 display the saved photographed images in thumbnails in display section 55.

FIG. 14 shows continuous-shooting image folder #1 out of thumbnail images in continuous-shooting image folders #1 to #9, as a representative. Display section 55 shows a list of the nine thumbnail images for continuous-shooting image folders #1 to #9.

Returning to the flow of FIG. 13, in step 42, the photographer selects a photographed image in continuous-shooting image folder #N from the first images of the image folders displayed in thumbnails using operation cross key 38.

In step 43, the first image in continuous-shooting image folder #N is displayed. In FIG. 15, display section 55 displays the first image in a predetermined continuous-shooting image folder by selecting a photographed image in continuous-shooting image folder #1, from among the first images in the image folders displayed in thumbnails.

In step 44, it is decided whether or not a predetermined photographing object has been selected from the thumbnail-displayed images. That is, the photographer selects a predetermined photographing object by operating operation cross key 38 while watching the displayed image. When no photographing object is selected, the process returns to step 43. When a specific photographing object is selected, photographed images of the selected photographing object are displayed from continuous-shooting image folder #1, based on the photographing object number recorded in the photographed image in step 45, and thereupon this flow is finished. In the example shown in FIG. 15, photographed image 88a001, photographed by adjusting focus and exposure upon a specific photographing object (S=001), is displayed. Next, to select another specific photographing object (S=002), the photographer presses the right arrow key following operation cross key 38 displayed in the right corner of display section 55, and thereupon the rectangular marking on the photographing object (S=001) moves right over the photographing object (S=002). By pressing SET operation section 40 in that state, photographed image 88a002 is read and displayed on display section 55, replacing photographed image 88a001. Selection of a predetermined photographing object is not limited to the above-described method of operating operation cross key 38, and other methods may be employed as well, including, for example, operating touch panel display section 55 and directly selecting a specific photographing object.

In this way, image recording section 12 records continuously-shot images of a plurality of photographing objects in a single continuous-shooting image folder and also stores an image of a specific photographing object out of images of a plurality of photographing objects stored in the continuous-shooting image folder as a representative image of the continuous-shooting image folder. The photographer can selectively output the images of the photographing object specified on this representative image. Furthermore, when an image of the specific photographing object is displayed, the image, placing the specific photographing object in the center, may be enlarged at an arbitrary magnification rate and displayed, or the image may be displayed with only a peripheral portion of the specific photographing object enlarged at an arbitrary magnification rate with respect to the whole image.

As described above, according to the present embodiment, faces of all photographing objects are detected and photographed at a high speed with focus and exposure adjusted upon one photographing object after another, so that it is possible to photograph all photographing objects in optimum conditions. Therefore, it is possible to take a photograph of each photographing object in optimum quality without placing load on the user.

Furthermore, the present embodiment detects the motion of the faces of a plurality of photographing objects one by one, so that, when object shake occurs, exposure is adjusted automatically to increase photographing sensitivity. That is, by photographing all photographing objects in optimum conditions, it is possible to reduce image quality degradation due to camera shake or object shake and take a photograph in a simple manner in good image quality.

Furthermore, when the photographing object is moving, the present embodiment puts off photographing of the photographing object and takes a photograph of this object later, so that the user may wait until the photographing object stops moving and photographing sensitivity is prevented from being increased more than necessary. This provides an advantage of leading to photographing and recording of a moving photographing object in good image quality.

Furthermore, when object shake occurs in the photographing object, by delaying the photographing order and photographing that object later again, it is possible to prevent a failure in taking a photograph such as a photograph of a person with closed eyes.

Furthermore, when object shake occurs, by automatically changing photographing sensitivity to high sensitivity, shortening exposure time and taking a photograph at a high shutter speed, it is possible to prevent image quality degradation due to object shake. Furthermore, since the image shake correcting function is started when a photograph is taken, it is possible to prevent image shake due to camera shake and reduce image quality degradation.

In this way, with digital camera 1 of the present embodiment, when the photographer needs only to set "face detection preference mode" upon taking a group photograph, and, with this single shutter operation, the user is able to photograph a plurality of photographing objects whose faces are detected in optimum photographing conditions for each photographing object and saves all photographed images with respective photographing object numbers in image recording section 12. Therefore, the photographer can read and output images managed according to their photographing object numbers as required at any time.

Although a case has been described above with the present embodiment where, when a photographing object is moving, photographing of that photographing object is put off, but a system may be adopted as well in which face detection section 120 detects the degree of smile of photographing objects, so that, if there is a photographing object who is not smiling, photographing this photographing object may be put off and taken when the photographing object starts smiling. Adopting such a system makes it possible to take a photograph (photographs) in a simple manner where all photographing objects are smiling.

Embodiment 2

Embodiment 2 will explain an example of detecting motion of faces of a plurality of photographing objects and setting a photographing mode.

The hardware configuration of the imaging apparatus according to Embodiment 2 of the present invention is substantially the same as shown in FIGS. 1 to 3, and so the explanations will be omitted.

The digital camera according to the present embodiment differs from the digital camera according to Embodiment 1 in that an arbitrary photographing object is selected from a plurality of photographing objects, motion of the face of the selected photographing object is detected and a photographing mode is made selectable.

Figure 16:
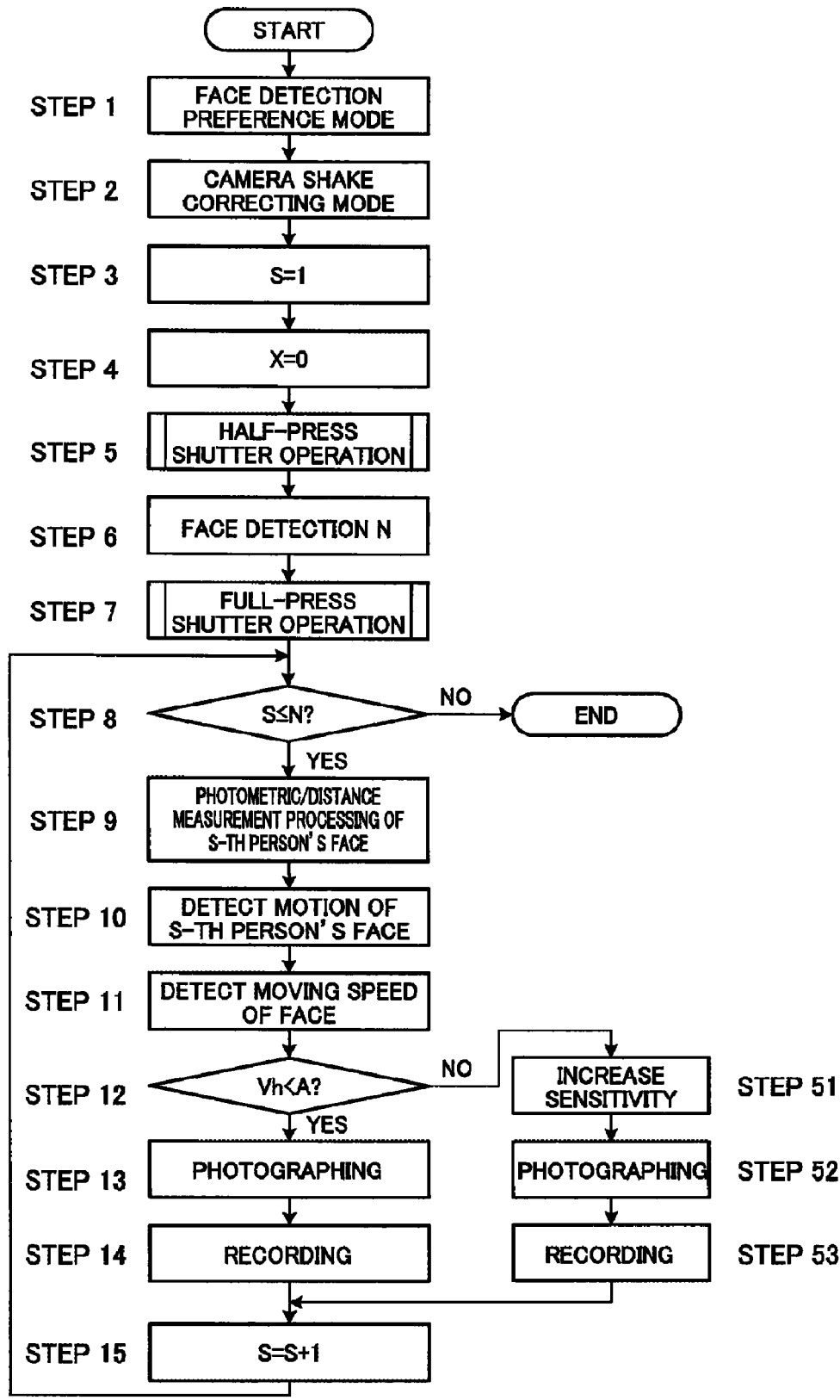
FIG. 16 is a flowchart showing photographing processing by an imaging apparatus according to Embodiment 2 of the present invention.

FIG. 16 is a flowchart showing photographing processing by digital camera 1 and steps carrying out the same processes as in the flow shown in FIG. 6 and FIG. 7 are assigned the same step numbers and overlapping explanations will not be repeated.

When the moving speed Vh is equal to or higher than the threshold A in step 12, the photographing mode is changed to photographing sensitivity increasing mode in step 51. That is, digital signal gain setting section 111 sets gain so as to enable high photographing sensitivity. Here, microcomputer 3 sets photographing sensitivity according to the moving speed of the photographing object. Therefore, microcomputer 3 calculates shutter speed that will not cause object shake from the moving speed Vh of the face of the photographing object, and sets photographing sensitivity at which the object can be photographed applying that shutter speed. For example, photographing sensitivity is set to ISO sensitivity 400 or equivalent according to the moving speed of the face of the photographing object.

In step 52, photographing processing is performed at high sensitivity. A photographing object image is formed in photographing sensor 4 and an image signal is outputted, and this image signal outputted from digital signal processing section 8 is amplified by the gain set in step 51. As for photographing sensitivity, an upper limit may also be made settable such as ISO sensitivity 1600 or equivalent to suppress degradation of photographed image quality.

In step 53, the image signal is recorded together with the photographing object number in image recording section 12 and thereupon this photographing processing is finished.

Thus, when object shake occurs, the present embodiment immediately changes photographing sensitivity to high sensitivity, shortens exposure time and takes a photograph at a high shutter speed, thereby preventing image quality degradation due to object shake. When a photographing object is moving, the present embodiment immediately changes photographing sensitivity to high sensitivity, shortens exposure time and takes a photograph without postponing photographing of the photographing object as in the case of Embodiment 1, thereby shortening the photographing/recording processing time. This results in shortening of real time processing and is useful in high-speed photographing or when there are a large number of photographing objects.

Embodiment 3

Figure 17:
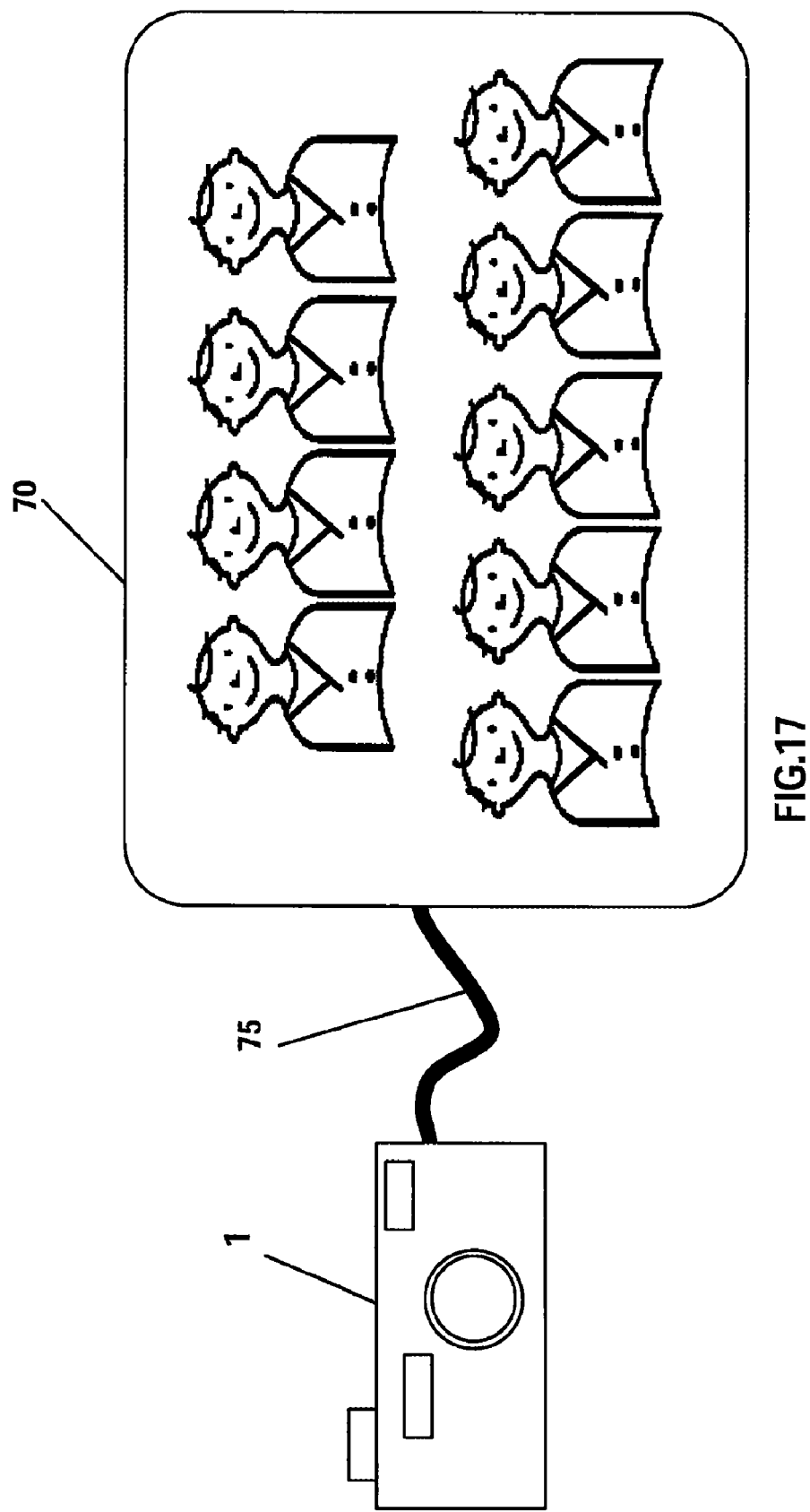
FIG. 17 shows an imaging apparatus and a display apparatus according to Embodiment 3 of the present invention.

FIG. 17 shows an imaging apparatus and display apparatus according to Embodiment 3 of the present invention.

The imaging apparatus according to the present embodiment has substantially the same configuration as digital camera 1 according to Embodiment 1. Digital camera 1 according to the present embodiment is connected to display apparatus 70 via USB (Universal Serial Bus) cable 75. Display apparatus 70 may be any display device such as a TV monitor.

Digital camera 1 according to the present embodiment is connected to display apparatus 70 via USB cable 75. Photographed images and thumbnail images are displayed on external display apparatus 70 connected to digital camera 1.

As shown in FIG. 17, a photographed image recorded together with its photographing object number in image recording section 12 of digital camera 1 is displayed on display apparatus 70 such as a TV monitor via USB cable 75. The image displayed on display apparatus 70 is controlled by image display control section 13 of digital camera 1. As in the case of Embodiment 1, this allows photographed images and these thumbnail images to be displayed on external display apparatus 70.

According to the present embodiment, when a digital camera is not provided with any display section or when the user wants to increase the display size of a photographed image, it is possible to display a photographed image on an external TV monitor, for example, and thereby provide comfortable display with good visibility and provide a convenient imaging apparatus and display apparatus as in the case of Embodiment 1.

The present embodiment has shown an example using a TV monitor as display apparatus 70 externally connected to digital camera 1, but the present invention is not limited to this. For example, a configuration may be adopted where the digital camera is connected to a personal computer connected to a monitor via a cable.

Furthermore, an example using USB cable 75 has been shown, but the present invention is not limited to this. For example, the digital camera may also be connected via a cable for IEEE (Institute of Electrical and Electronic Engineers) 1394 serial bus or wirelessly connected using a wireless LAN or the like.

Embodiment 4

Figure 18:
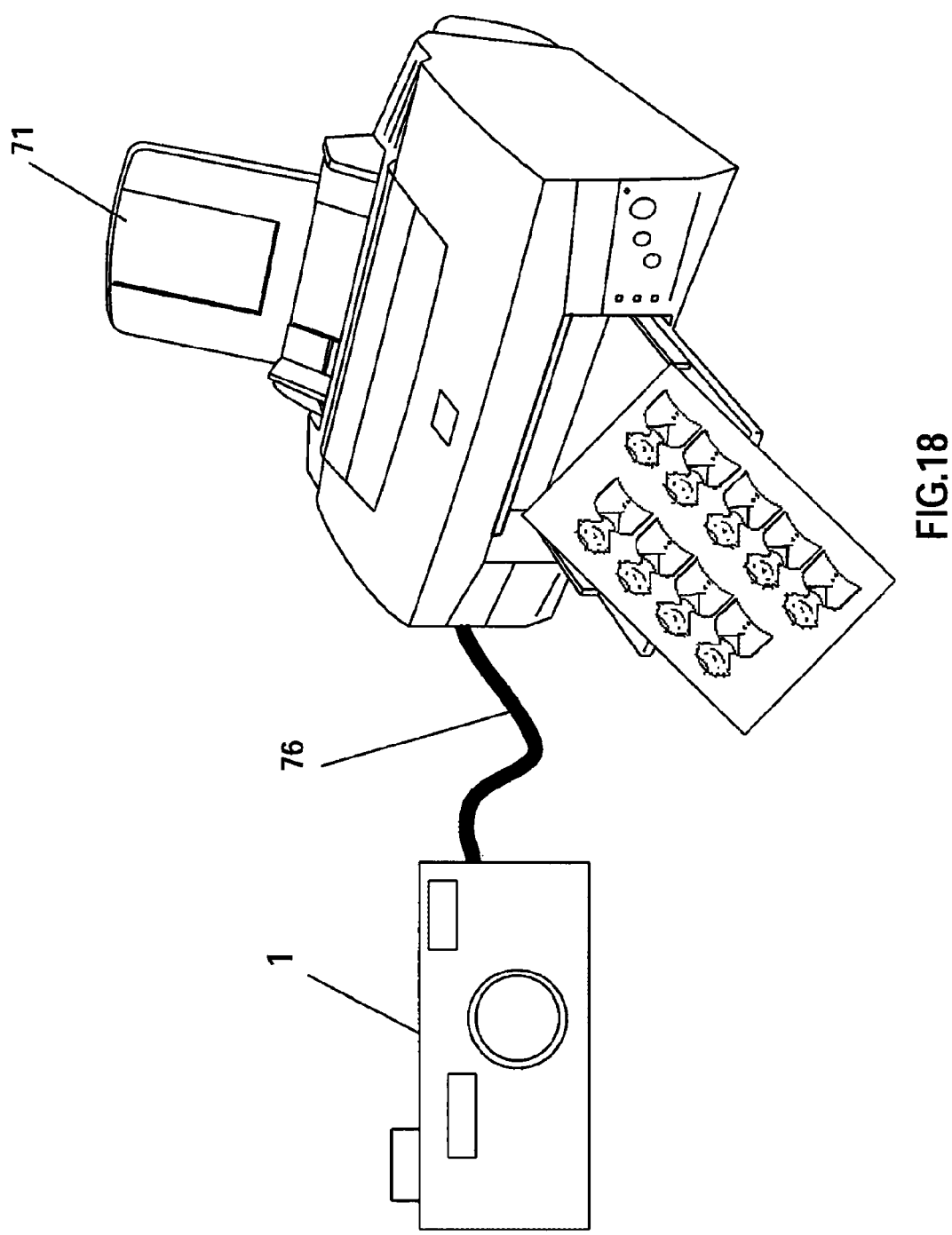
FIG. 18 shows an imaging apparatus and a printing apparatus according to Embodiment 4 of the present invention.

FIG. 18 shows an imaging apparatus and printing apparatus according to Embodiment 4 of the present invention.

Imaging apparatus according to the present embodiment has substantially the same configuration as digital camera 1 of Embodiment 1. Digital camera 1 according to the present embodiment is connected to printing apparatus 71 via USB cable 76. Printing apparatus 71 is, for example, an ink jet color printer having a communication control function.

Digital camera 1 according to the present embodiment is connected to printing apparatus 71 via USB cable 76. Photographed images or thumbnail images are printed by external printing apparatus 71 connected to digital camera 1.

As shown in FIG. 18, photographed images recorded together with their photographing object numbers in image recording section 12 of digital camera 1 are sent to printing apparatus 71 via USB cable 76 and printed. USB cable 76 may be, for example, a dedicated cable. Since photographed images printed by printing apparatus 71 are controlled by image display control section 13 of digital camera 1, the photographed images can be printed by external printing apparatus 71 in the same way as Embodiment 1.

Next, a printing method for printing a photographed image obtained through photographing using digital camera 1 by printing apparatus 71 will be explained.

Figure 19:
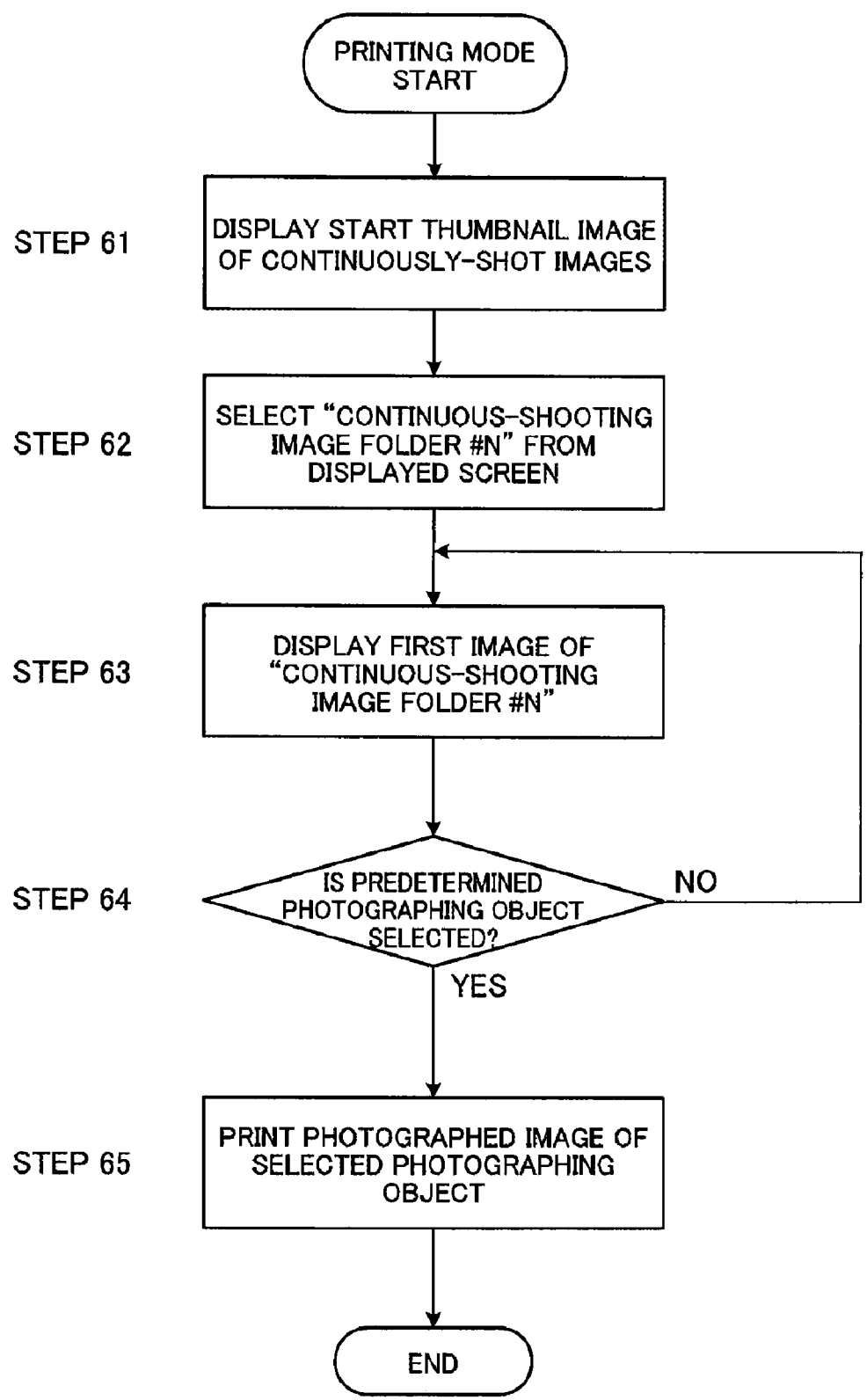
FIG. 19 is a flowchart showing a method of printing an image photographed by the imaging apparatus according to Embodiment 4.

FIG. 19 is a flowchart illustrating a method of printing a photographed image, which is implemented by microcomputer 3.

This flow is started when power switch 35 of digital camera 1 is turned on and photographing/playback switching operation section 37 is changed to printing playback mode.

The photographer turns on power switch 35 to make display section 55 display in thumbnails photographed images for each image folder first, and then changes photographing/playback switching operation section 37 to printing playback mode.

In step S61, microcomputer 3 displays a start thumbnail image of continuously-shot images. Image recording section 12 of digital camera 1 or removable memory 51 saves all images photographed in one continuous shooting. Therefore, microcomputer 3 can cause image display control section 13 to display in thumbnails the saved photographed images on display section 55. As shown in FIG. 14 above, for example, nine thumbnail images in continuous-shooting image folders #1 to #9 are displayed in a list.

In step 62, the photographer selects a photographed image to be printed in continuous-shooting image folder #N from among the first image in the image folders displayed in thumbnails using operation cross key 38.

In step 63, the first image in continuous-shooting image folder #N is displayed.

In step 64, it is decided whether or not a photographing object to be printed has been selected from the thumbnail-displayed image. The photographer selects the photographing object to be printed from the displayed image by operating operation cross key 38. If no photographing object to be printed is selected, the process returns to step 63. When a specific photographing object is selected, a photographed image to be printed of the photographing object selected from continuous-shooting image folder #1 based on the photographing object number recorded in the photographed image in step 65 is printed, and thereupon the present flow is finished. Furthermore, when the image of a specific photographing object is printed, the image may be enlarged centered on the specific photographing object at an arbitrary magnification rate and printed, or only a peripheral portion of the specific photographing object may be enlarged at an arbitrary magnification rate with respect to the whole image and printed.

In this way, the photographer can select a photographed image in optimum image quality based on photographing object numbers recorded in the photographed images by operating digital camera 1 and print the selected photographed image in optimum image quality, so that it is possible to realize comfortable printing with high visibility and provide an imaging apparatus and printing apparatus with a high degree of convenience.

The present embodiment has shown an example where a printer is directly connected as an external printing apparatus, but the present invention is not limited to this. For example, the imaging apparatus may also be connected to a personal computer connected to a printer via a cable.

Furthermore, an example using USB cable 75 has been shown, but the present invention is not limited to this. For example, the imaging apparatus may also be connected via a cable for IEEE (Institute of Electrical and Electronic Engineers) 1394 serial bus or wirelessly connected using a wireless LAN or the like.

Embodiment 5

Figure 20:
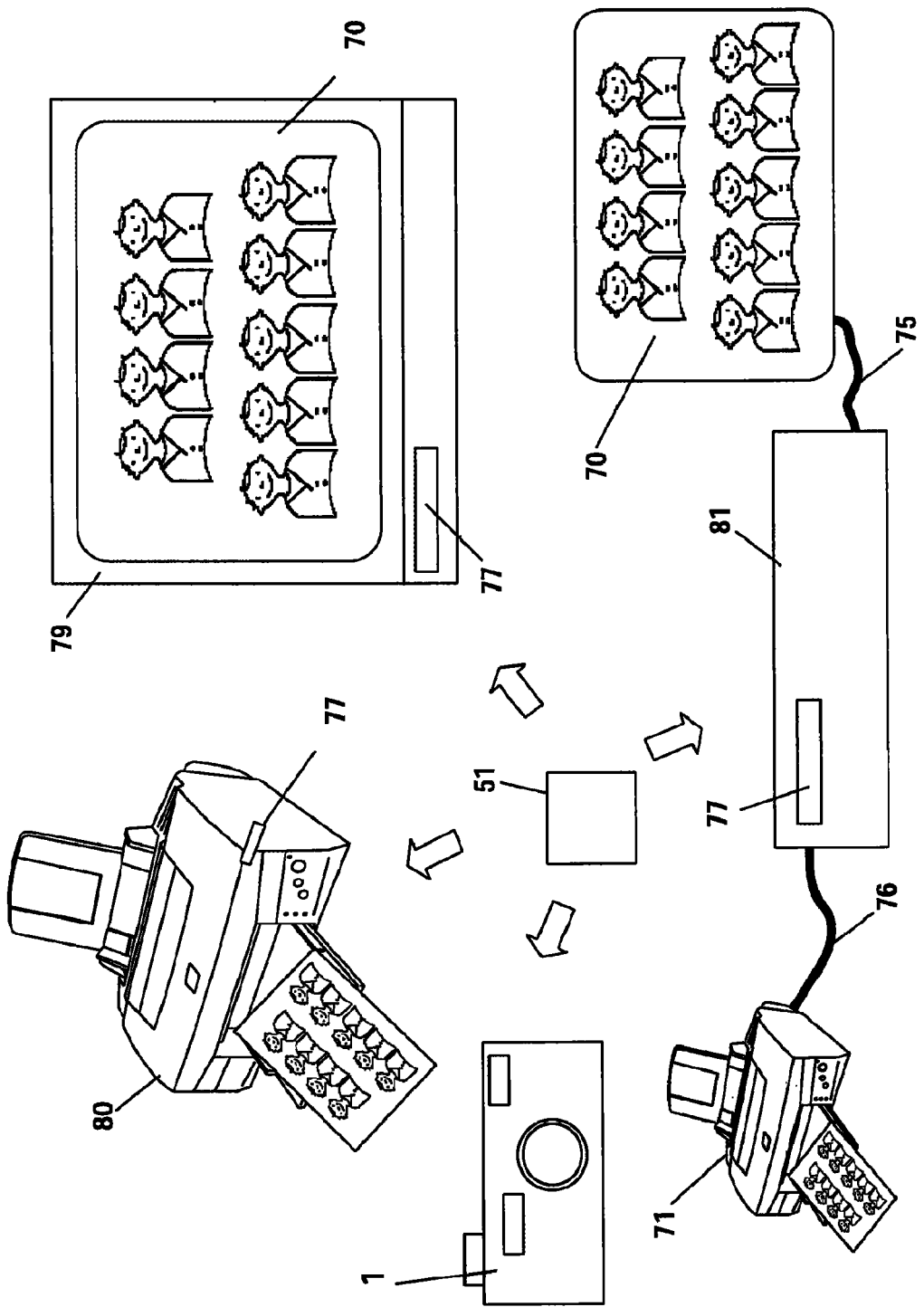
FIG. 20 shows an imaging apparatus, a display apparatus and a printing apparatus according to Embodiment 5 of the present invention.

FIG. 20 shows an imaging apparatus, display apparatus and printing apparatus according to Embodiment 5 of the present invention. The same components as those in FIG. 17 and FIG. 19 will be assigned the same reference numerals and explanations thereof will be omitted In FIG. 20, the reference numeral 51 designates a removable memory such as an SD memory, 79 designates a display control apparatus, 80 designates a printing control apparatus and 81 designates a display printing control apparatus. Display control apparatus 79, printing control apparatus 80 and display printing control apparatus 81 are provided with detachable removable memory insertion section 77 that allows removable memory 51 to be attached and detached.

The imaging apparatus according to the present embodiment has substantially the same configuration as digital camera 1 of Embodiment 1. Digital camera 1 according to the present embodiment is connected to printing apparatus 71 via USB cable 76. Display control apparatus 79 is, for example, a TV monitor provided with removable memory insertion section 77 and a control section (not shown) thereof. Printing control apparatus 80 is, for example, an ink jet color printer provided with removable memory insertion section 77 and a control section (not shown) thereof. Display printing control apparatus 81 is, for example, a personal computer provided with image processing software and monitor.

A photographed image taken by digital camera 1 is recorded together with its photographing object number in removable memory 51 such as a detachable memory card. Removable memory 51 is not limited to a memory card, but may also be a hard disk or optical disk or the like.

Removable memory 51 is inserted into movable memory insertion section 77 of display control apparatus 79 and display control apparatus 79 reads the photographed images recorded in removable memory 51 and displays the images on display apparatus 70. The photographed images displayed on display apparatus 70 are subjected to display control as in the case of Embodiment 1 based on the photographing object numbers recorded in removable memory 51.

Furthermore, display control apparatus 79 can read the photographed images obtained by digital camera 1 and the photographing object numbers from removable memory 51 and display the photographed images and their thumbnail images on the display apparatus.

As shown in FIG. 20, similar effects can also be obtained when printing is performed by printing control apparatus 80 provided with removable memory insertion section 77 or when display is performed with display printing control apparatus 81 connected to display apparatus 70 or when printing is performed with display printing control apparatus 81 connected to printing apparatus 71.

The present embodiment has shown an example of using a display apparatus provided with removable memory insertion section 77, printing apparatus and display printing control apparatus, but the present invention is not limited to this. For example, it is also possible to adopt a configuration of connecting a reading apparatus such as a memory card reader capable of reading removable memory 51, display printing control apparatus, display apparatus and printing apparatus.

The above described explanations are illustrations of preferred embodiments of the present invention and the present invention is by no means limited to these.

The present invention is applicable to any electronic apparatus having imaging apparatus. For example, the present invention is applicable not only to digital cameras and video cameras but is also applicable to information processing apparatus such as cellular phones with a camera, portable information terminal such as personal digital assistants (PDA's), and personal computers with imaging apparatus.

Furthermore, although embodiments have been described such that the total number of photographing objects is nine, this is by no means limiting and the number of photographing objects can be greater than 9.

Furthermore, the photographing order of photographing objects is not limited to the order described above and other orders may be employed as well.

Furthermore, although embodiments have been described such that all photographing objects whose faces are detected are photographed by adjusting exposure and focus individually, it is also possible to photograph only specific photographing objects. For example, the system may also decide whether or not to take a photograph according to the sex or age, for example.

Furthermore, embodiments have been described such that whether or not to take a photograph or put off photographing is decided by detecting motion of the faces of N photographing objects, but such a decision may be skipped and simply all the N photographing objects may be photographed.

Furthermore, at the time of playback/printing, images around the respective photographing objects may be cut from nine photographed images 88a001, 88a002 . . . , and the nine photographing object images may be combined into one image. Combining images this way allows one image to be easily created with focus and exposure adjusted to one photographing object.

Furthermore, the configuration of the imaging optical system and the camera shake correcting section of the above embodiments are not limited to the examples described herein. For example, the camera shake correcting section may drive the imaging sensor in two directions perpendicular to the optical axis with respect to the imaging optical system. Furthermore, for example, the camera shake correcting section may change the angle of the prism mounted in the front in the photographing object side of the lens barrel or may drive the whole of the lens barrel, and the configuration is not limited to these configurations as long as camera shake can be corrected.

Furthermore, it is also possible to electronic camera shake correction schemes of correcting camera shake by changing positions for sampling image in the imaging sensor or taking a plurality of photographs of the same photographing object at short shutter speed and combining these photographs into one image. Obviously, the scheme is not limited to these or to the examples described herein.

Furthermore, the respective embodiments have calculated the moving speed of a photographing object using a motion vector, but the present invention is not limited to this and the moving speed of a photographing object may also be detected using a separate external sensor or the like.

Furthermore, although cases have been described with the above-described embodiments where exposure time to the imaging sensor is controlled by operating the shutter, the present invention is not limited to this, and exposure time to the imaging sensor may be controlled using an electronic shutter or the like.

Furthermore, although a case has been described above with the present embodiment where a plurality of photographs can be taken consecutively by operating the shutter operation section once, it is also possible to adopt a system whereby it is possible to take a picture only while the shutter operation section is operated (pressed).

Furthermore, although with the above embodiments the distance measurement are is set by detecting a face, but a system may be employed as well whereby the AF area may be set by detecting specific colors.

Furthermore, although the digital camera according to each embodiment has an imaging optical system, the present invention is not limited to this. As in the case of a single-lens reflex camera system, the present invention is also applicable to imaging apparatus where a lens barrel that holds an imaging optical system and a camera including an imaging sensor are used separately. For example, the present invention is applicable to the whole of a system where a lens barrel that holds an imaging optical system and a camera are provided separately and the photographer can use the lens barrel and the camera in combination.

Furthermore, the digital camera according to the present embodiment may also be a system capable of automatically printing as many copies as the photographing objects centered on photographing objects one by one by taking advantage of a high number of pixels of the imaging element.

Furthermore, although with the herein-contained embodiments the term "imaging apparatus" is used for ease of explanation, other terms including "photographing apparatus," "digital camera" and "imaging method" may be used as well.

Moreover, the components configuring the above-described digital camera, for example, the type of the imaging optical system, the drive section and the mounting method, and moreover the type of the detecting section or the like are not limited to the embodiments described herein.

Furthermore, the imaging apparatus explained above can also be implemented by a program for making the photographing control method for this imaging apparatus function. This program is stored in a computer-readable record media.

As described above, according to the present invention, by recognizing faces of a plurality of photographing objects when, for example, a group photograph is taken, photographing them at a high speed in optimum focus and exposure conditions for each of the plurality of photographing objects, it is possible to reduce image quality degradation due to camera shake or object shake and take photographs in a simple manner in good image quality without placing load on the user.

Furthermore, by detecting motion of the face of each of a plurality of photographing objects one by one, it is possible, when object shake occurs, to take photographs with a high amplification factor of image signals and in a short exposure time. By taking photographs of all photographing objects in optimum photographing conditions at a high speed, it is possible to reduce image quality degradation due to camera shake or object shake and take photographs in a simple manner in good image quality.

The imaging apparatus according to the present invention is suitable for use in a digital still cameras and digital video cameras where image in good image quality is required, cellular phones having a camera section and PDA's.

What is claimed is:

1. An imaging apparatus comprising:
   an imaging optical system that forms an optical image of an object to be photographed;
   an imaging sensor that receives the formed optical image, converts the optical image to an electrical image signal and outputs the image signal;
   a distance measuring section that performs distance measurement processing of a distance measuring condition for a plurality of objects, based on the image signal of the imaging sensor;
   a photometric processing section that performs photometric processing of an exposure condition for the plurality of objects, based on the image signal of the imaging sensor; and
   a control section that performs continuous shooting to capture the plurality of objects in an optimum exposure condition and an optimum distance measuring condition at respective measured distances, by a single shutter operation.

2. The imaging apparatus according to claim 1, further comprising a recording section that records images capturing a plurality of distances taken by the continuous shooting.

3. The imaging apparatus according to claim 2, wherein the recording section records the images capturing the plurality of distances taken by the continuous shooting, in a single image folder.

4. The imaging apparatus according to claim 1, further comprising a display section that displays images,
   wherein, upon displaying an image capturing the plurality of objects at the respective measured distances, the display section shows markings on the plurality of objects.

5. The imaging apparatus according to claim 2, further comprising a display section that displays images,
   wherein, upon displaying an image capturing the plurality of objects at the respective measured distances, the display section shows markings on the plurality of objects.

* * * * *